US009034788B2

(12) United States Patent
Böhringer et al.

(10) Patent No.: US 9,034,788 B2

(45) Date of Patent: May 19, 2015

(54) FILTER MATERIAL COMPRISING POROUS ORGANIC POLYMERS

(75) Inventors: Bertram Böhringer, Wuppertal (DE); Sven Fichtner, Premnitz (DE); Stefan Kaskel, Dresden (DE); Marcus Rose, Aachen (DE)

(73) Assignee: BLÜCHER GMBH, Erkrath (DE)

( * ) Notice: Subject to any disclaimer, the term of this patent is extended or adjusted under 35 U.S.C. 154(b) by 227 days.

(21) Appl. No.: 13/812,051

(22) PCT Filed: Jul. 15, 2011

(86) PCT No.: PCT/EP2011/003525

§ 371 (c)(1),
(2), (4) Date: Apr. 12, 2013

(87) PCT Pub. No.: WO2012/016634

PCT Pub. Date: Feb. 9, 2012

(65) Prior Publication Data

US 2014/0162872 A1 Jun. 12, 2014

(30) Foreign Application Priority Data

Jul. 24, 2010 (DE) ........................ 10 2010 032 196

(51) Int. Cl.

| | |
|---|---|
| ***B01J 20/26*** | (2006.01) |
| ***B01D 53/02*** | (2006.01) |
| ***B01J 31/06*** | (2006.01) |
| ***C08G 61/02*** | (2006.01) |
| ***C08G 61/10*** | (2006.01) |
| ***C08J 9/02*** | (2006.01) |
| ***C08J 9/35*** | (2006.01) |
| ***B01J 20/28*** | (2006.01) |

(52) U.S. Cl.

CPC ............... *B01J 20/262* (2013.01); *B01D 53/02* (2013.01); *B01D 2253/202* (2013.01); *B01D 2256/16* (2013.01); *B01D 2257/93* (2013.01); *B01D 2259/4583* (2013.01); *B01J 31/06* (2013.01); *C08G 61/02* (2013.01); *C08G 61/10* (2013.01); *C08G 2261/131* (2013.01); *C08G 2261/312* (2013.01); *C08J 9/02* (2013.01); *C08J 9/35* (2013.01); *C08J 2365/00* (2013.01); *B01J 20/28064* (2013.01); *B01J 20/28071* (2013.01); *B01J 20/2808* (2013.01)

(58) Field of Classification Search

CPC ........................................................ B01J 20/26
USPC ........................... 423/347; 502/401, 402, 526
See application file for complete search history.

(56) References Cited

FOREIGN PATENT DOCUMENTS

DE 21 06 396 A1 * 7/1971

OTHER PUBLICATIONS

Shin, Y et al.: "A novel low-temperature dendritic cyclotrimerization of 2,6-diacetyl pyridine leading to mesoporous carbon containing pyridine rings."; Jul. 1, 2009; XP026131311; pp. 346-347; figures 1-2.*

* cited by examiner

*Primary Examiner* — Edward Johnson

(57) ABSTRACT

The invention relates to a unit which comprises a multitude of particles based on porous organic polymers, wherein the organic polymers are obtainable by poly(acetylcyclotrimerization) of polyacetyl-functionalized or polyacetylated aromatics and/or polyacetyl-functionalized or polyacetylated polycycles, and to the different uses or possible applications of this unit.

22 Claims, 9 Drawing Sheets

FILTER MATERIAL COMPRISING POROUS ORGANIC POLYMERS

CROSS-REFERENCES TO RELATED APPLICATIONS

This application is a National Stage filing of International Application PCT/EP 2011/003525, filed Jul. 15, 2011, claiming priority to German Applications No. DE 10 2010 032 196.6 filed Jul. 24, 2010, entitled "Unit Comprising Porous Organic Polymers and Use Thereof I." The subject application claims priority to PCT/EP 2011/003525, and to German Applications No. DE 10 2010 032 196.6 and incorporates all by reference herein, in their entirety.

BACKGROUND OF THE INVENTION

The present invention relates to a unit that comprises a plurality of particles based on porous organic polymers and the use of said unit, in particular for the area of filtration, gas scrubbing, catalysis, gas storage and sorption, in particular adsorption, preferably of gases.

Moreover, the present invention relates to the use of the unit according to the invention in filters and filter materials, especially textile filters and filter materials, in gas scrubbing devices, in catalysts, in gas storage tanks, and in protective clothing, especially ABC protective clothing.

Furthermore, the present invention relates to the use of the unit according to the invention for removing harmful, odoriferous and toxic substances of all kinds, especially from air and/or gas streams, for example in ABC protective-mask filters, odor filters, surface filters, air filters, especially filters for room-air purification, adsorptive carrier structures and filters for the medical area.

Finally, the present invention relates to filters and filter materials, especially textile filters and filter materials, and gas scrubbing devices, catalysts, gas storage tanks and protective clothing, especially ABC protective clothing, which in each case have been made using the unit according to the invention or which in each case have the unit according to the invention.

The development of novel porous and especially microporous materials, especially adsorbents, is an important branch of materials science. Many fields of application require more efficient materials, and a large number of potential new fields of application have appeared in recent years.

There is a demand for novel porous materials, especially adsorbents, in the area of storage of various gases, for example hydrogen, methane etc., as well as various special gases; for gases with high toxicity or risk of explosion, with adsorptive storage for example the potential danger can be reduced or the storage capacity can be increased.

New microporous materials can, however, also find application in heterogeneous catalysis, in particular as catalysts or catalyst supports with a very high specific surface and uniformly distributed active sites. Moreover, usage is conceivable in the separation and purification of materials, in selective membranes, in sensor technology etc.

Most of the commercially used microporous adsorbents are inorganic materials, e.g. zeolites, clathrates, activated charcoal etc., but sometimes these are unable to meet more demanding requirements and can be replaced with more efficient new adsorbents.

A whole range of new porous or microporous materials or classes of materials with a purely organic basis or with a hybrid basis (e.g. hybrid polymers with an organic-inorganic basis) has been developed in recent years.

From the standpoint of classical polymer chemistry, porous polymers were the first of their kind in this area. The first results in the area of hypercrosslinked polymers (HCPs, hypercrosslinked polymers) were published in the year 1969. The hypercrosslinked polystyrenes known as "Davankov resins" have been produced commercially and used as ion exchange resins and adsorbents since the 1990s.

The synthesis of hypercrosslinked polymers generally starts with precrosslinked polymers, which are swollen in a suitable solvent, so that free space is formed between the polymer chains. In the second step, the swollen chains are then crosslinked by suitable reactions, e.g. Friedel-Crafts alkylation etc. If the solvent is then removed, the bridged chains remain rigidly separated from one another, and the formerly free space is accessible as a pore space. In the case of the Davankov resins, specific surfaces of up to approx. 1500 $m^2/g$ are reached, with pore sizes in the micropore and the mesopore range. Recently, however, other HCPs, e.g. hypercrosslinked polyanilines, have also been produced.

In contrast to HCPs, which are crosslinked postsynthetically, there are also microporous polymers that are produced by using polyfunctional monomers. This also produces a network with pore space that cannot collapse, because of its rigidity. For example, the synthesis of polyamides (PAs) and polyimides (PIs) with a tetrafunctional spirobifluorene monomer is known; the polyimide networks have specific surfaces of about 1000 $m^2/g$, whereas the polyamide networks have a pore system that is too small, and is not accessible for nitrogen molecules.

A larger new class of porous polymers, which has grown considerably in recent years, comprises the polymers of intrinsic microporosity (PIMs). The basis for synthesis is a condensation reaction of aromatic monomers with hydroxyl groups and fluorinated or chlorinated aromatic monomers with formation of dioxane rings. In contrast to the aforementioned HCPs, the resultant polymers are not in highly crosslinked form. In the PIMs, the porosity comes about through inefficient packing of the polymer chains in space, due to the rigidity of the monomer molecules. Dense packing is prevented by rigid chains, and free pore space remains accessible. Surface areas of up to approx. 1065 $m^2/g$ have been described. A special property of the PIMs is their combination of microporosity and solubility. With dissolution and then removal of the solvent again, the porosity is retained, which greatly simplifies the processing of the PIMs and opens up possible new applications; for example, the production of microporous membranes for separating gases, such as carbon dioxide and methane, or the adsorption of phenol from aqueous solution has been described.

For all the aforementioned microporous polymers, numerous studies have been conducted for storage of gases, such as hydrogen and methane. A disadvantage of porous polymers in gas storage is their low density, as they only consist of light elements. This leads—regardless of the gas—to relatively poor volumetric storage capacities.

Another disadvantage of the porous polymers mentioned so far is that disordered networks are present, mostly with wide pore size distributions. However, ordered networks are advantageous for very high specific surfaces with good accessibility. In addition, the pores can then be tailored for corresponding properties and uses by means of a modular construction of the structures.

This concept is embodied in the microporous organometallic structures or coordination polymers (also called MOFs, metal organic frameworks). MOFs are constructed from polyfunctional molecules (e.g. carboxylates) as organic linkers and metal ions or metal clusters as inorganic connectors.

These three-dimensional coordination polymers are crystalline compounds with extremely high specific surfaces. However, nearly all MOFs have the disadvantage of mostly very pronounced sensitivity to hydrolysis and a certain degree of toxicity, which can arise depending on the type of metal (e.g. in the case of chromium etc.).

In contrast, nearly all porous polymers are resistant to hydrolysis, as strong covalent bonds form exclusively. In addition, in polymers, toxicity due to metals can be ruled out, as they are only constructed from light elements.

The modular principle by which the MOFs are constructed was transferred to covalently bound, metal-free network compounds (COFs or covalent organic frameworks). COFs are synthesized by a reaction of condensation of polyfunctional boronic acids either directly with one another to form boroxin rings ($B_3O_3$) or together with hydroxyl-functionalized aromatics to form $C_2O_2B$ rings. The principle of construction corresponds to that of the MOFs, except that, instead of metal ions or metal clusters, rings containing boron and oxygen serve as connectors between the organic linkers. The COFs are the first covalently bound networks to display order. In addition, they are characterized by relatively high specific surfaces, which can certainly compete with those of the MOFs. A disadvantage of the COFs is the sensitivity of the boroxin rings to hydrolysis, so that the compounds are decomposed after prolonged action of the humidity of the air.

Now, the problem to be solved by the present invention is to provide particles based on porous organic polymers, in particular a unit comprising a plurality of particles based on porous organic polymers, which at least largely avoid or else at least lessen the disadvantages of the prior art described above.

Another problem to be solved by the present invention is to provide particles based on porous organic polymers, especially a unit comprising a plurality of particles based on porous organic polymers, which ensure universal usability and in particular are suitable for the area of filtration, for gas scrubbing, for catalysis, for gas storage and/or for sorption, especially adsorption, preferably of gases.

BRIEF SUMMARY OF THE INVENTION

To solve the problems described above, the present invention proposes—according to a first aspect of the present invention—comprising a plurality or a large number of particles based on porous organic polymers; further advantageous configurations of this aspect of the invention are disclosed herein.

A further object of the present invention—according to further aspects of the present invention—is the use of the unit according to the invention comprising a plurality of particles based on porous organic polymers.

According to yet another aspect of the present invention, the present invention further relates to the filters and filter materials defined herein, especially textile filters and filter materials, and gas scrubbing devices, catalysts, gas storage tanks and protective clothing, especially ABC protective clothing, which in each case are produced using the unit according to the invention or which in each case have the unit according to the invention.

It goes without saying that in the following, special configurations, embodiments or the like, which are only described in connection with one aspect of the invention, also apply correspondingly with regard to the other aspects of the invention, without this requiring express mention.

Furthermore, for all the relative or percentage, especially weight-based amounts stated below, it is to be borne in mind that in the context of the present invention these are to be selected by a person skilled in the art in such a way that the total always comes to 100%. However, this is obvious to a person skilled in the art.

Moreover, a person skilled in the art may deviate, depending on the application or in an individual case, from the figures, ranges or amounts stated below, while remaining within the scope of the present invention.

Moreover, all figures for variables or the like stated in the following can basically be determined with standardized or explicitly stated methods of determination or else with methods of determination that are familiar per se to a person skilled in the art.

BRIEF DESCRIPTION OF THE DRAWINGS

FIG. 1A to 1C shows starting compounds or educt molecules (“linkers”) usable according to the invention for the production of the porous organic polymers usable in the unit according to the invention, wherein in the formulas shown in FIGS. 1A to 1C the residue “Ac” denotes an acetyl group $CH_3$—C(O)— and the residue “R”, in each case independently (i.e. therefore also possibly with various meanings within the same molecule), denotes hydrogen or an organic residue, selected in particular from the group of alkyl, alkenyl, alkynyl, alkoxy and aryl, a halogen or an amine group, wherein FIG. 1A shows bifunctional linker molecules, whereas FIGS. 1B and 1C show trifunctional or tetrafunctional linker molecules, respectively;

FIG. 2A), OFC-3 (cf. FIG. 2B) and OFC-4 (FIG. 2B), wherein the symbol “*” in each case indicates the repeating units;

DETAILED DESCRIPTION OF THE INVENTION

Figure 1A:
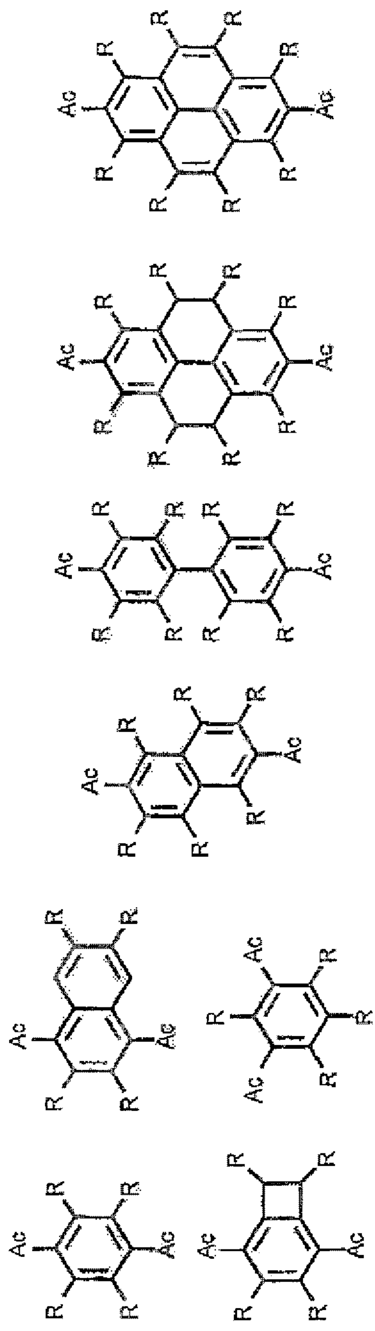
Figure 1A:
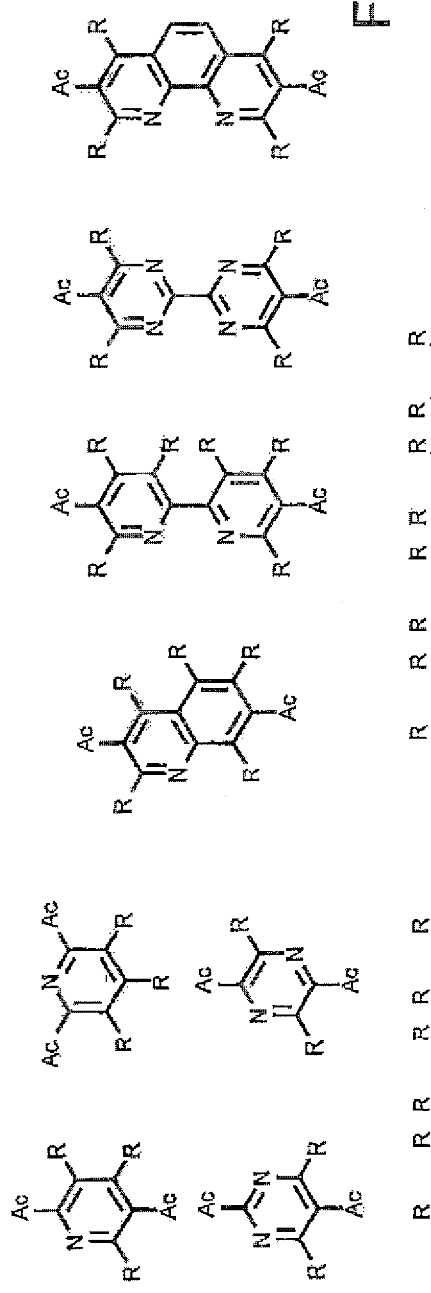
Figure 1A:
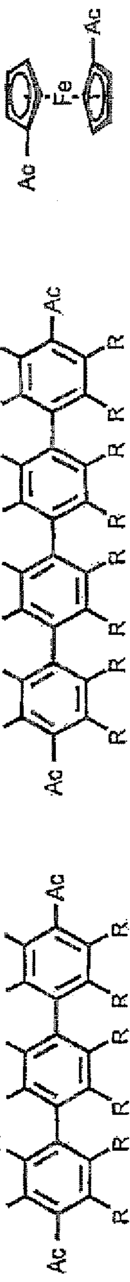

The applicant found, entirely surprisingly, that the problem to be solved by the present invention, as described above, can be solved by a unit consisting of a plurality of particles based on porous organic polymers, wherein the organic polymers can be obtained by poly(acetylcyclotrimerization) of polyacetyl-functionalized (i.e. polyacetylated) aromatics or polycycles. The term plurality or, synonymously, large number, as used according to the invention, denotes in particular at least 10 particles, especially at least 100 particles, preferably at least 1000 particles, especially preferably at least 10 000 particles, quite especially preferably at least 100 000 particles, even more preferably at least 1 000 000 particles, per unit according to the invention, wherein the number of particles per unit according to the invention can be up to several million or even several billion particles or more.

The present invention therefore relates—according to a first aspect of the present invention—to a unit that comprises a plurality of particles based on porous organic polymers, wherein the organic polymers are obtainable by poly(acetylcyclotrimerization) of polyacetyl-functionalized (i.e. polyacetylated or substituted with at least two acetyl groups) aromatics and/or polyacetyl-functionalized (i.e. polyacetylated or substituted with at least two acetyl groups) polycycles.

As the applicant in fact found, surprisingly and completely unexpectedly, porous organic polymer particles can be produced, especially in the form of individual particles or in the form of agglomerates of particles that have an internal pore system or have a porous structure, by poly(acetylcyclotrimerization) of polyacetyl-functionalized aromatics or polycycles, offering the possibility of universal application, for example in the area of filtration, gas scrubbing, catalysis, gas storage and sorption, especially adsorption.

The polymers or polymer particles obtainable by poly(acetylcyclotrimerization)—occasionally also designated hereunder synonymously as “OFCs” (organic frameworks via cyclotrimerization), “OFC materials”, “OFC compounds” or the like—have porous, especially microporous, and generally hydrophobic or nonpolar polymer networks, so that they appear to be particularly suitable for the aforementioned applications.

In the context of the present invention, the applicant found, for the first time and surprisingly, that the OFC materials used according to the invention are, owing to their porosity, eminently suitable for the aforementioned applications, and, with respect to these applications, surprisingly are at least equivalent in performance to conventional porous materials, if not even exceed the performance of the conventional porous materials.

In this connection, it is also important that, owing to the fact that the porosity, in particular the pore size and/or pore size distribution and/or specific surface, can be adjusted or tailored in the context of the method of production of the OFC materials, high selectivity can be achieved with respect to sorption behavior, especially adsorption behavior, wherein the porosity, especially the pore size and/or pore size distribution, can be controlled or adjusted or tailored for example via the type and/or size of the starting compounds used (in addition to the individual reaction conditions).

In particular, particle sizes and porosities, especially pore sizes and/or pore size distributions, of the OFC materials used according to the invention can be adjusted widely via the type and/or amount of the starting compounds used and/or via the reaction conditions. Accordingly, it is possible that the porous polymer particles present in the unit according to the invention contain micro-, meso- and/or macropores. The presence of micro-, meso- and/or macropores can—like other properties determined hereunder (e.g. pore volume, pore surface area, BET surface etc.)—be determined for example by nitrogen adsorption measurements according to DIN 66131, DIN 66135 and/or DIN 66134, in particular at temperatures of 77 K.

In the context of the present invention, the term micropores denotes pores with pore diameters of up to and including 20 Å, whereas the term mesopores denotes pores with pore diameters in the range from more than 20 Å (i.e. >20 Å) up to and including 500 Å and the term macropores denotes pores with pore diameters of more than 500 Å (i.e. >500 Å), wherein these definitions of pores correspond to the definitions as given for example in *Pure Appl. Chem.* 45 (1976), pages 71 ff., especially Page 79:

micropores: pore $\text{diameter}_{micropores} \leq 20$ Å mesopores: 20 Å $<$ pore $\text{diameter}_{mesopores} \leq 500$ Å macropores: pore $\text{diameter}_{macropores} > 500$ Å.

A particular advantage of the special OFC-based porous organic polymers or polymer particles used in the unit according to the invention is the fact that the porosity, especially pore size and/or pore size distribution and/or pore surface area, of these porous materials—as well as the particle size—can be adjusted selectively in the context of the synthesis by poly(acetylcyclotrimerization), especially—as described above—via the type and/or amount of the starting compounds and/or via the detailed process engineering (e.g. process duration, process temperatures, type of catalysis, especially the catalysts selected, execution as solid-state reaction or in solution/suspension etc.). Thus, in relation to the aforementioned possibilities of modification, for example OFCs usable according to the invention can be produced with monomodal distribution of pore size, for example OFCs with a predominantly microporous fraction or OFCs with a predominantly mesoporous fraction or OFCs with a predominantly macroporous fraction. However, it is also equally possible to obtain polymodal pore size distributions (e.g. OFCs in each case with high, e.g. roughly equal, proportion of micropores on the one hand and meso- and/or macropores on the other hand), if it is desirable in the context of the present application.

Accordingly, depending on the starting compounds or educt molecules (i.e. starting monomers) used in each case and the reaction conditions selected, the properties of the porous OFC polymers or OFC polymer particles used according to the invention, for example the internal surface areas (BET) and/or pore volumes and/or pore sizes etc., can be varied or adjusted controllably over a wide range, as is described below.

Thus, in the context of the unit according to the invention, as described above, porous organic polymer particles are used, which can be obtained by poly(acetylcyclotrimerization) of polyacetyl-functionalized or polyacetylated aromatics or polycycles (e.g. adamantane).

The term unit, as used according to the invention, denotes in particular a plurality or a large number of spatially, especially spatially and functionally continuous polymers or polymer particles. In other words the term unit according to the invention denotes an entity or a composite of spatially, especially spatially and functionally continuous porous polymers or polymer particles. The spatial, especially spatial and functional continuity can be achieved in various ways: for example, the spatial, especially spatial and functional continuity can be produced by the individual polymer particles of the unit according to the invention being loose, especially in the form of a loose bed, but surrounded by an outer housing, an outer shell, an outer casing or the like or being combined to form the unit according to the invention; such an embodiment is suitable for example when the unit according to the invention is to be used for filters, filtration applications or gas storage tanks. Furthermore, it is possible for the spatial, especially spatial and functional continuity to be produced by applying the individual polymer particles of the unit according to the invention on a common carrier or fixing them to it and spatially connecting them or bringing them, together indirectly via this carrier, and in this embodiment the covering of the carrier can be such that the individual polymer particles are in contact with one another or are separated and do not touch; such an embodiment with carrier material is important for example when using surface filters, especially textile surface filters, or supported catalyst systems. Thus, the term unit used according to the invention generally denotes a spatially, especially spatially and functionally, indirectly or directly continuous composite or entity of a large number of particles based on porous organic polymers of the aforementioned type.

As described above, the starting compounds or starting monomers used are polyacetyl-functionalized aromatics (e.g. mono-, bi- or polycyclic, mono- or polynuclear aromatics, optionally substituted and/or optionally containing heteroatoms, with at least two acetyl groups) or polyacetyl-functionalized or polyacetylated polycycles (e.g. adamantane containing at least two acetyl groups etc.). Regarding further details of the starting compounds or starting monomers (educt molecules) that can be used, reference may be made to the following explanation.

As described above, the porous organic polymers used according to the invention are obtainable by poly(acetylcyclotrimerization). The basic principle of acetylcyclotrimerization is illustrated by the following reaction equation, wherein in this reaction equation the residue R denotes an organic residue, especially an aromatic system:

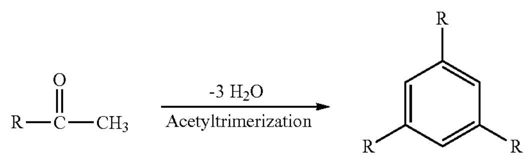

The main reaction described above illustrates the principle of acetylcyclotrimerization. Owing to the fact that, in the context of the present invention, polyacetyl-functionalized or polyacetylated aromatics and/or polycycles are used, i.e. aromatics or polycycles that have at least two acetyl groups per molecule, the result is crosslinked, especially spatially crosslinked polymer structures, which form a porous polymer network. This is shown in simplified form in the following reaction equation for the case when exclusively identical starting compounds are used for the poly(acetylcyclotrimerization), wherein in the following reaction equation the residue "Ar" stands for an aromatic residue and "n" denotes the number of acetyl groups per starting compound (wherein "n" denotes an integer, e.g. 2, 3 or 4) and "3 m" denotes the number of starting compounds brought together for reaction (wherein "m" represents an integer, in particular with values as further described below):

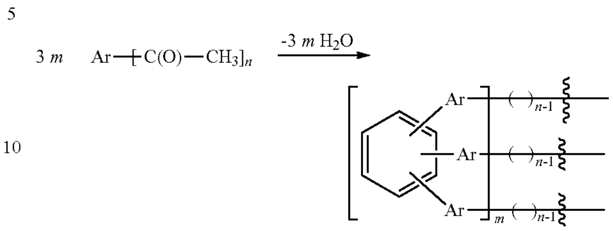

In general, the poly(acetylcyclotrimerization) is catalyzed, preferably acid-catalyzed. The catalyst used can be selected in particular from the group of inorganic and/or organic acids or salts, hydrogen halides, Lewis acids and mixtures or combinations thereof. For example, concentrated sulfuric acid is suitable as inorganic acid for the catalysis of poly(acetylcyclotrimerization), especially in combination with a sulfate salt, such as potassium pyrosulfate, wherein a catalyst combination of potassium pyrosulfate and concentrated sulfuric acid for example is especially suitable when the poly(acetylcyclotrimerization) is carried out in the solid phase or as a solid-state reaction, as described in more detail below.

For example $FeCl_3$, $AlC_3$, $TiCl_4$ and titanium trichloride triflate $TiCl_3(OTf)$ are suitable as Lewis acids. Hydrogen chloride can be used in particular as hydrogen halide, wherein the hydrogen halide, especially hydrogen chloride, can also be generated in situ, in particular by hydrolysis of silicon tetrachloride $SiCl_4$ with alcohol, especially ethanol.

The poly(acetylcyclotrimerization) can basically be carried out either as a solid-state and/or solid-phase reaction (i.e. as a reaction in the solid phase) or as a reaction in the liquid phase, especially in solution or dispersion, preferably in solution, wherein the reaction in the liquid phase is preferred according to the invention.

The poly(acetylcyclotrimerization) can be carried out in a wider temperature range, in particular at temperatures in the range from −50° C. to 250° C., especially −5° C. to 200° C., preferably 0° C. to 150° C.

Furthermore, the poly(acetylcyclotrimerization) can be carried out in wide ranges of pressure, especially at a pressure in the range from 0.01 to 50 bar absolute, especially 0.1 to 10 bar absolute, preferably at atmospheric pressure (1.013 bar absolute). Pressures above atmospheric pressure are suitable in particular when the reaction is carried out in the solid phase.

The poly(acetylcyclotrimerization) of the specially selected polyacetylated starting compounds results in porous organic polymers or polymer particles, which in each case have a nonlinear-crosslinked, especially two- and/or three-dimensional-crosslinked, preferably star- and/or tetrahedral-crosslinked, structure. This network is responsible for the porosity of the organic polymers or polymer particles obtainable in this way. Owing to the nonlinear, crosslinked structure, for the polymers or polymer particles used according to the invention it is not possible to determine or state average molecular weights or other parameters that are usually employed for the characterization of linear polymers. Therefore in the case of the present invention the polymers used can only be characterized reliably by the production process.

Regarding the porous organic polymers or polymer particles used according to the invention, these have in each case a large number of repeating structural units of the type of a 1,3,5-substituted phenyl residue with in each case aromatic and/or polycyclic residues in the 1-, 3- and 5-positions. The number of repeating structural units in the polymer network can vary widely: generally the number of repeating structural units of the aforementioned type per polymer molecule is at least 25, especially at least 50, preferably at least 75, especially preferably at least 100; the number of repeating structural units per polymer molecule can be up to 10 000 000, especially up to 5 000 000, preferably up to 1 000 000, especially preferably up to 500 000. In particular, the number of repeating structural units of the aforementioned type per polymer molecule can be in the range from 25 to 10 000 000, especially 50 to 5 000 000, preferably 75 to 1 000 000, especially preferably 100 to 500 000.

According to a special embodiment of the present invention, the porous organic polymers used in the unit according to the invention have in each case a large number of repeating structural units of the type

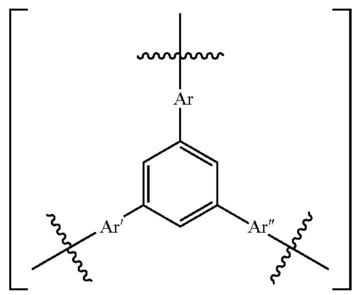

wherein the residues Ar, Ar' and Ar", in each case independently of one another, denote an optionally substituted aromatic or polycyclic, preferably aromatic, residue. The number of repeating structural units per polymer molecule can be at least 25, especially at least 50, preferably at least 75, especially preferably at least 100; the number of repeating structural units per polymer molecule can be up to 10 000 000, especially up to 5 000 000, preferably up to 1 000 000, especially preferably up to 500 000. In particular, the number of repeating structural units per polymer molecule can be in the range from 25 to 10 000 000, especially 50 to 5 000 000, preferably 75 to 1 000 000, especially preferably 100 to 500 000.

According to yet another special embodiment of the present invention, the porous organic polymers used according to the invention can in each case have a large number of repeating structural units of the type

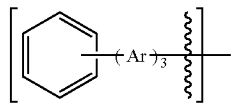

wherein the residue Ar denotes an optionally substituted aromatic or polycyclic, preferably aromatic, residue. The number of repeating structural units per polymer molecule can be in particular at least 25, especially at least 50, preferably at least 75, especially preferably at least 100; in particular, the number of repeating structural units per polymer molecule can be up to 10 000 000, especially up to 5 000 000, preferably up to 1 000 000, especially preferably up to 500 000. In particular, the number of repeating structural units per polymer molecule can be in the range from 25 to 10 000 000, especially 50 to 5 000 000, preferably 75 to 1 000 000, especially preferably 100 to 500 000.

The fact that the organic polymers or polymer particles used according to the invention are heat-resistant, especially up to temperatures of at least 100° C., especially at least 150° C., preferably at least 200° C., especially preferably at least 300° C., is to be seen as a particular advantage of the present invention.

Furthermore, the organic polymers or polymer particles used according to the invention are resistant to protic solvents or media, and in particular are resistant to hydrolysis.

Furthermore, the organic polymers or the polymer particles used according to the invention are generally of hydrophobic form and in particular have hydrophobic surfaces, which is due to the type of production. Therefore they are particularly suitable for the storage and/or sorption, especially adsorption, of nonpolar substances or gases.

As has also been described, the organic polymers or polymer particles used according to the invention are generally of nonpolar form and have nonpolar surfaces, and this explains their suitability for the storage or sorption, especially adsorption, of nonpolar substances or gases.

As described above, the organic polymers or polymer particles used according to the invention form a hydrophobic and/or polar, porous, especially microporous, polymer network.

As described above, the polyacetyl-functionalized aromatics or polycycles used as starting compounds or starting monomers have at least two acetyl groups per molecule, especially two, three or four acetyl groups per molecule. In other words, in general the polyacetyl-functionalized aromatics or polycycles used as starting compounds or starting monomers for the poly(acetylcyclotrimerization) are substituted with at least two acetyl groups, in particular are substituted with two, three or four acetyl groups. In order to tailor or adjust or control the particle sizes and/or the porosities and/or the degrees of crosslinking and/or the sizes of polymers, mixtures of different starting compounds of the aforementioned type, especially mixtures of starting compounds with different numbers of acetyl groups, can also be used or reacted.

According to a special embodiment of the present invention, the polyacetyl-functionalized aromatics or polycycles to be used according to the invention for the poly(acetylcyclotrimerization) are in particular selected from the group of the following compounds and combinations or mixtures thereof, wherein in the following formulas the residue "Ac" denotes an acetyl group $CH_3$—C(O)— and the residue "R", in each case independently (i.e. therefore also possibly with various meanings within the same molecule), denotes hydrogen or an organic residue, in particular selected from the group of alkyl, alkenyl, alkynyl, alkoxy and aryl, a halogen or an amine group:

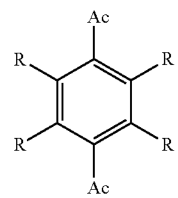

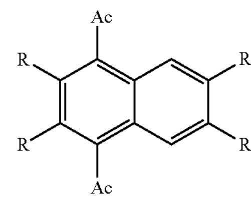

-continued
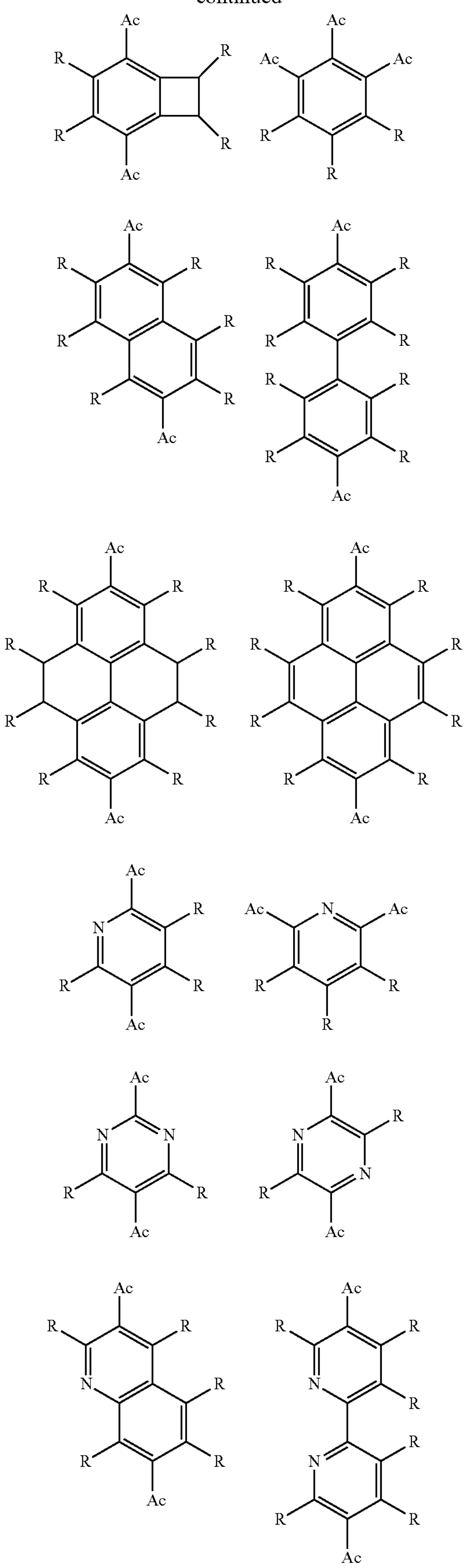
-continued
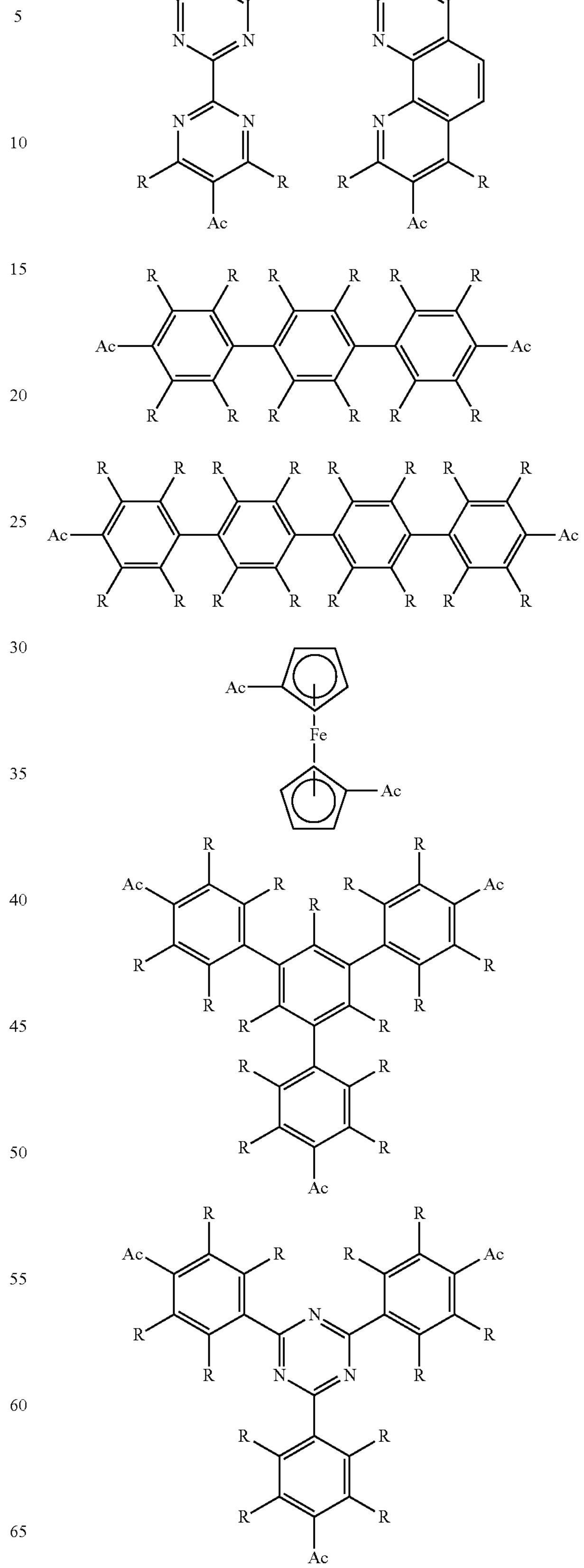

-continued
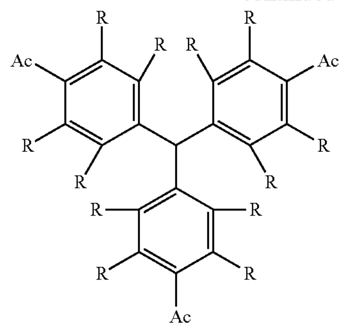
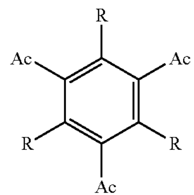
Y = B, N
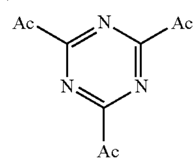
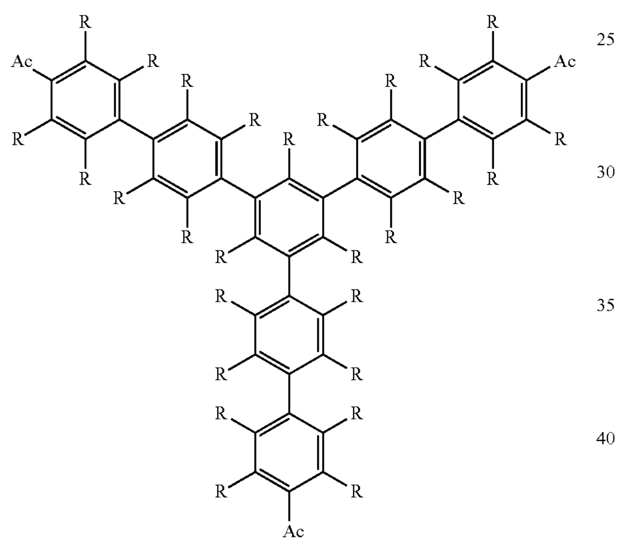
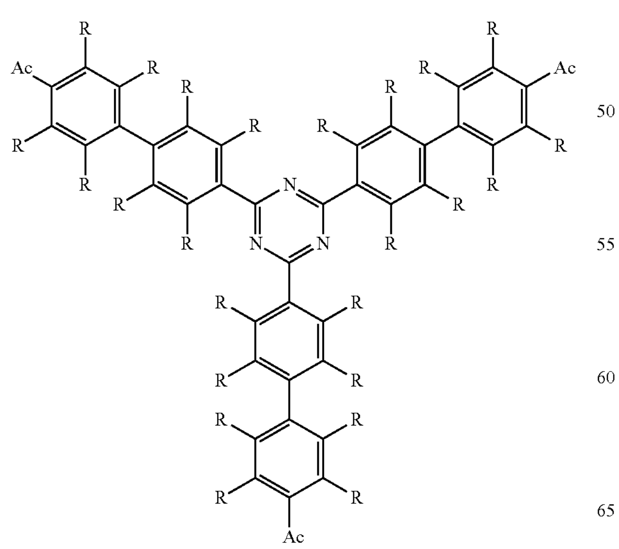
-continued
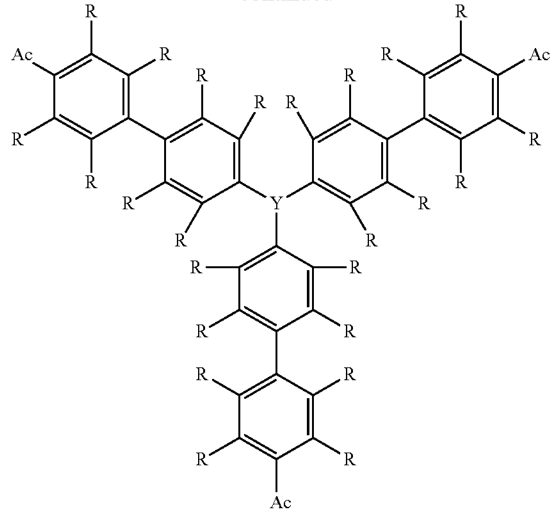
Y = B, N
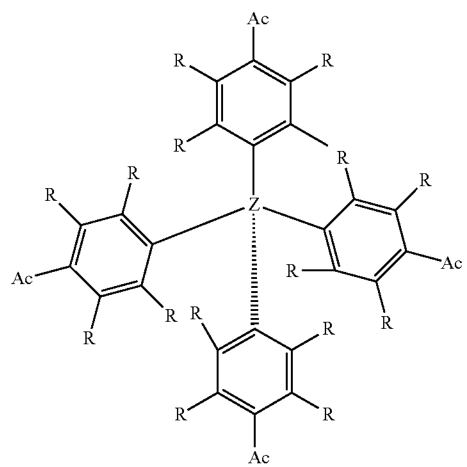
Z = C, Si
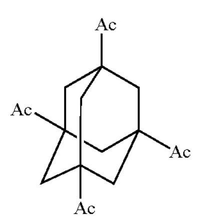

-continued

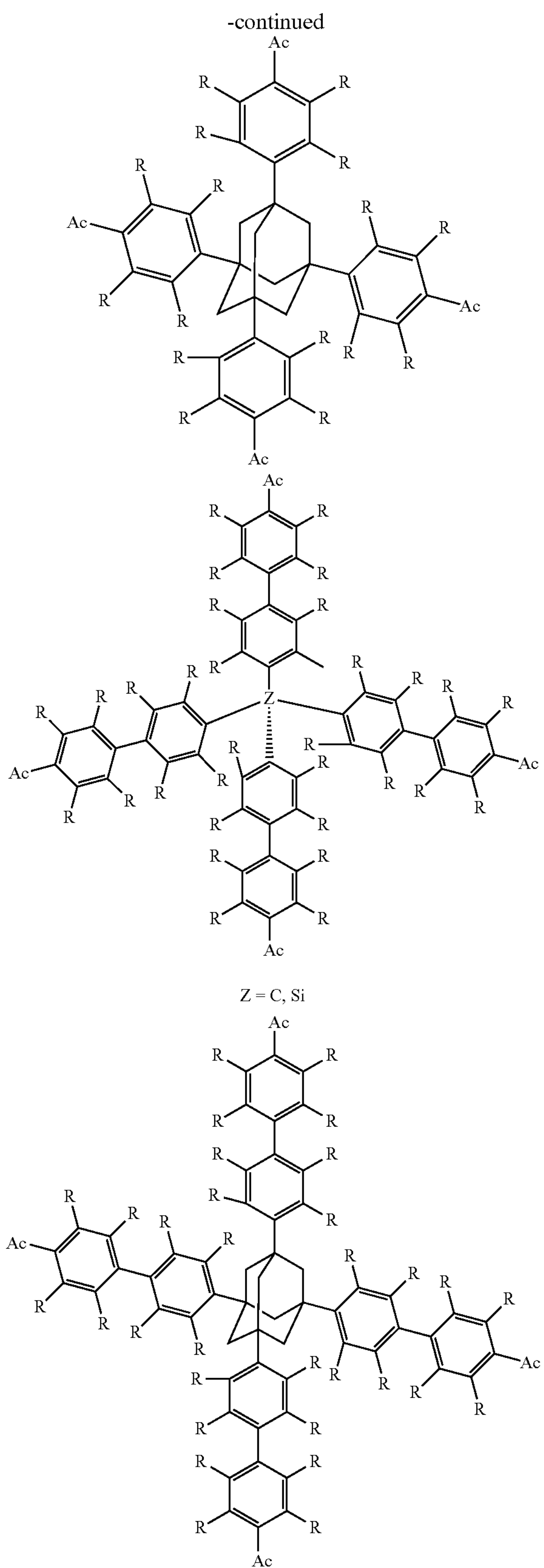

Figure 1B:
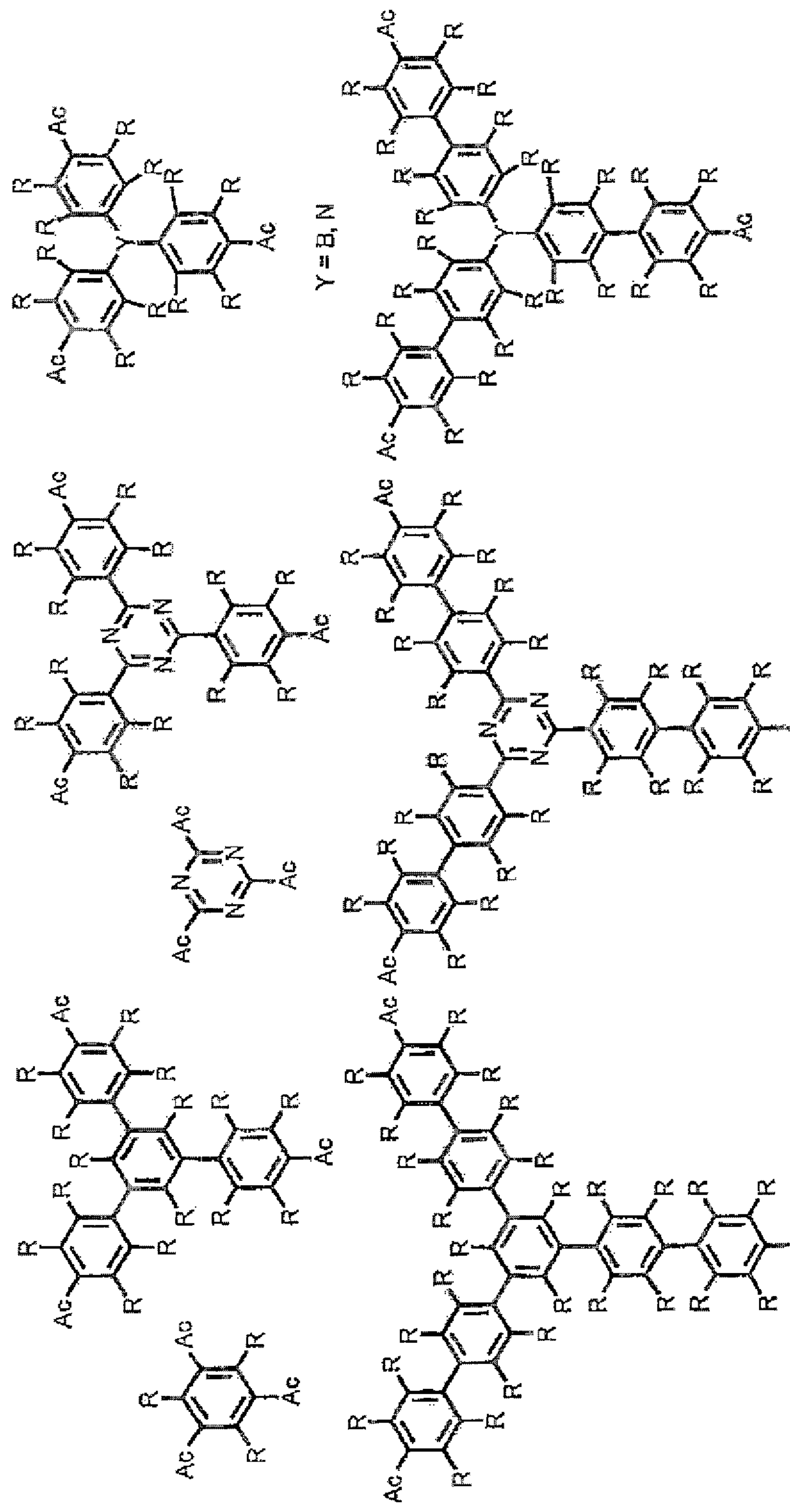
Figure 1C:
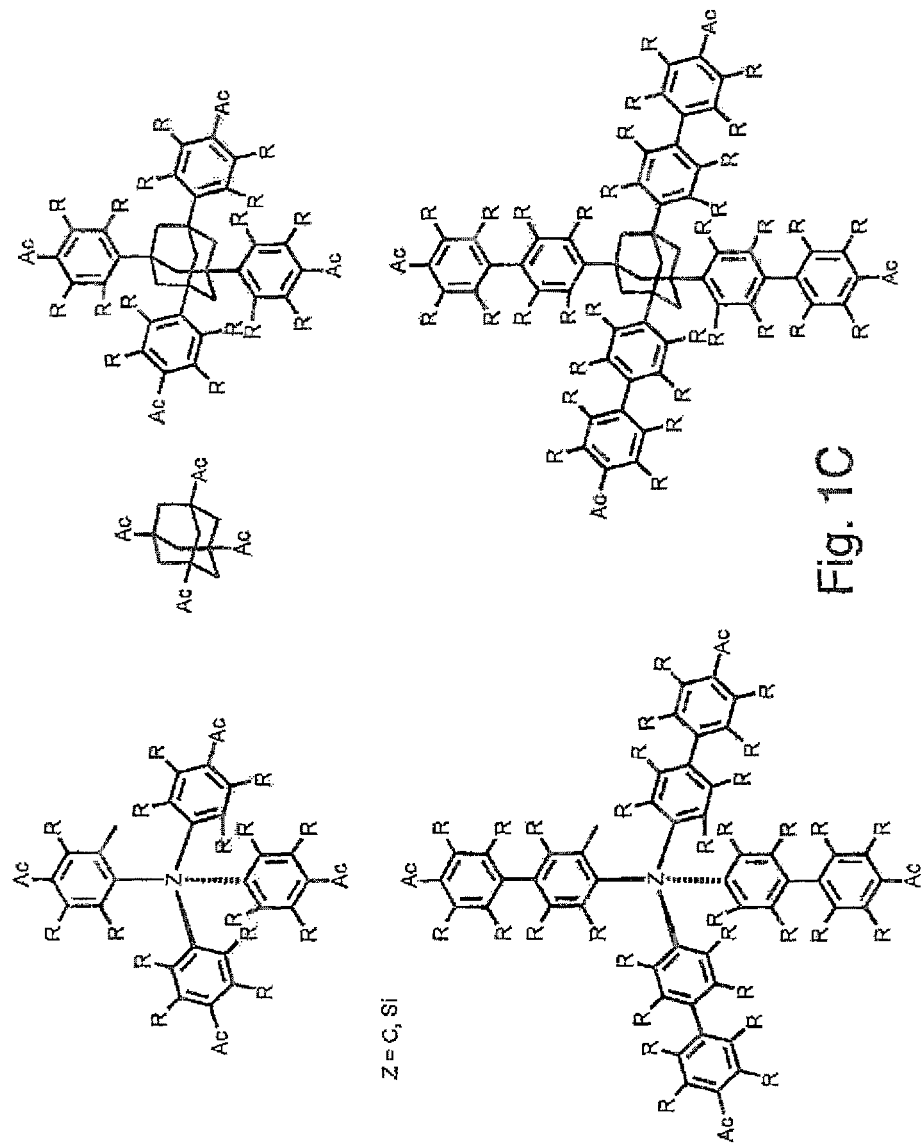

The figures according to FIGS. 1A to 1C show starting compounds or educt molecules ("linkers") usable according to the invention for the production of the porous organic polymers usable in the unit according to the invention, wherein in the formulas shown in FIGS. 1A to 1C the residue "Ac" denotes an acetyl group $CH_3$—C(O)— and the residue "R", in each case independently (i.e. therefore also possibly with various meanings within the same molecule), denotes hydrogen or an organic residue, selected in particular from the group of alkyl, alkenyl, alkynyl, alkoxy and aryl, a halogen or an amine group. FIG. 1A shows bifunctional linker molecules, whereas FIG. 1B or 1C shows trifunctional or tetrafunctional linker molecules.

According to a special embodiment, the unit according to the invention or the polymer particles can be in the form of a loose bed. In this case the polymer particles can in particular be surrounded by a spatial boundary, preferably a housing, a casing, a shell or enveloping structure, or a frame or the like. Such an embodiment is suitable for example for filter applications (e.g. so-called packed filters) or for gas storage tanks.

According to another special, but alternative, embodiment, the polymer particles can be united and/or processed into a molded article. This can for example be carried out by compacting the individual polymer particles or by using a binder, e.g. an adhesive.

According to yet another further special, and alternative, embodiment, the polymer particles of the unit according to the invention can be applied on at least one carrier or carrier material, and in particular fixed to it. Depending on the intended use, suitable carriers or carrier materials can be selected for example from the group of textile materials (e.g. textile fabrics, such as woven fabrics, knitted fabrics etc., or foams), support materials for catalysts (e.g. ceramic supports or carbon supports etc.), plastics or plastic-based materials, ceramic materials, metallic materials and combinations-thereof. In this embodiment, it can for example be envisaged that the carrier, especially in the case of a textile carrier material, can be of a form that is gas-permeable, especially air-permeable; the carrier can in particular have a gas permeability, especially air permeability, of at least 10 $l \cdot m^{-2} \cdot s^{-1}$, especially at least 30 $l \cdot m^{-2} \cdot s^{-1}$, preferably at least 50 $l \cdot m^{-2} \cdot s^{-1}$, especially preferably at least 100 $l \cdot m^{-2} \cdot s^{-1}$, quite especially preferably at least 500 $l \cdot m^{-2} \cdot s^{-1}$, and/or up to 10 000 $l \cdot m^{-2} \cdot s^{-1}$, especially up to 20 000 $l \cdot m^{-2} \cdot s^{-1}$, at a flow resistance of 127 Pa. According to this embodiment, the carrier can have a three-dimensional structure (wherein the carrier can for example preferably be in the form of an open-cell foam, especially preferably as polyurethane foam) or alternatively can have a two-dimensional and/or flat structure (wherein the carrier can in this case preferably be in the form of a textile fabric, especially of a woven fabric, knitted fabric, laid fabric or textile composite, in particular a nonwoven, and/or wherein the carrier in this case can have a specific weight from 5 to 1000 $g/m^2$, especially 10 to 500 $g/m^2$, preferably 25 to 450 $g/m^2$).

Regarding the porous organic polymer particles as such, these can be in powder form or preferably in granular form, especially spherical form, or in the form of agglomerates.

The particle size of the polymer particles or agglomerates thereof can vary over a wide range. The polymer particles or agglomerates thereof usually have particle sizes in the range from 0.0001 μm to 10 mm, especially 0.001 μm to 5 mm, preferably 0.005 μm to 3 mm, especially preferably 0.01 μm to 2 mm, quite especially preferably 0.1 μm to 1.5 mm.

The average particle sizes of the polymer particles or agglomerates thereof used according to the invention, determined as the so-called D50 value, are usually in the range from 0.001 μm to 8 mm, especially 0.005 μm to 2 mm, preferably 0.01 μm to 1 mm.

The particle sizes and average particle sizes can be determined by methods that are known per se by a person skilled in the art. ASTM D2862-97/04 is suitable in particular for particle size determination.

The figures for variables relating to characterization of the porosity and related parameters, such as in particular total porosity, internal surface area, pore size, pore size distribution, adsorption volume, adsorbed volume, total pore volume, micropore volume fraction etc., are found in each case in the nitrogen isotherms of the relevant or measured OFC material, especially the nitrogen isotherms at low temperatures (usually at T=77 kelvin, unless stated otherwise below).

As described above, the OCF material used according to the invention has internal voids, especially pores, i.e. the organic polymers (OFCs) used according to the invention are of porous form. This results in relatively high internal surface areas and total pore volumes.

Similarly, the total pore volume of the polymer particles used according to the invention can also vary over a wide range. In particular the polymer particles used according to the invention have a total pore volume of at least 0.05 $cm^3/g$, especially at least 0.1 $cm^3/g$, preferably at least 0.2 $cm^3/g$; furthermore, the polymer particles used according to the invention have a total pore volume generally of up to 2.0 $cm^3/g$, especially up to 3.0 $cm^3/g$, preferably up to 4.0 $cm^3/g$, especially preferably up to 5.0 $cm^3/g$. Usually the polymer particles used according to the invention have a total pore volume in the range from 0.05 $cm^3/g$ to 5.0 $cm^3/g$, especially 0.1 $cm^3/g$ to 4.0 $cm^3/g$, preferably 0.2 $cm^3/g$ to 3.0 $cm^3/g$. The aforementioned total pore volumes refer in particular to values that have been determined by the so-called Gurvich method ($p/p_0$=0.995). Regarding determination of the total pore volumes according to Gurvich, this is a method of measurement/determination that is known per se by a person skilled in the art; for further details regarding determination of total pore volume according to Gurvich, reference may be made for example to L. Gurvich (1915), J. Phys. Chem. Soc. Russ. 47, 805, and to S. Lowell et al., *Characterization of Porous Solids and Powders: Surface Area Pore Size and Density*, Kluwer Academic Publishers, Article Technology Series, pages 111 ff.

According to a special embodiment, at least 20%, especially at least 30%, preferably at least 40%, especially preferably at least 50%, of the total pore volume of the polymer particles is formed by micropores with pore diameters of ≤20 Å. In general, 20% to 99%, especially 30% to 95%, preferably 40% to 90%, especially preferably 50% to 80%, of the total pore volume of the polymer particles is formed by micropores with pore diameters of ≤20 Å. In particular the micropore volume of the polymer particles formed by micropores with pore diameters of ≤20 Å is in the range from 0.01 to 1.5 $cm^3/g$, especially 0.02 to 1.2 $cm^3/g$, preferably 0.05 to 1 $cm^3/g$. The aforementioned data on micropore volume are determined in particular by the Carbon Black method of determination.

The Carbon Black method of determination is known per se by a person skilled in the art, so no further details are needed regarding this. Moreover, for further details on the Carbon Black determination of pore surface area and pore volume, reference may be made for example to R. W. Magee, Evaluation of the External Surface Area of Carbon Black by Nitrogen Adsorption, Presented at the Meeting of the Rubber Division of the American Chem. Soc., October 1994, summarized e.g. in: Quantachrome Instruments, AUTOSORB-1, AS1 WinVersion 1.50, Operating Manual, OM, 05061, Quantachrome Instruments 2004, Florida, USA, pages 71 ff.

Regarding the average pore diameter of the polymer particles used according to the invention, this too can vary over a wide range. Usually the average pore diameter of the polymer particles is at most 100 Å, especially at most 50 Å, preferably at most 30 Å. In general the average pore diameter of the polymer particles is in the range from 1 to 100 Å, especially 2 to 75 Å, preferably 5 to 50 Å, especially preferably 10 to 30 Å.

Furthermore, the internal surface area (BET surface) of the polymer particles used according to the invention can also vary over a wide range. In general the BET surface of the polymer particles is at least 100 $m^2/g$, especially at least 200 $m^2/g$, preferably at least 250 $m^2/g$, preferably at least 300 $m^2/g$, especially preferably at least 400 $m^2/g$. The BET surface of the polymer particles is usually up to 1800 $m^2/g$, especially up to 2000 $m^2/g$, preferably up to 2500 $m^2/g$, especially preferably up to 3000 $m^2/g$, quite especially preferably up to 6000 $m^2/g$, even more preferably up to 7000 $m^2/g$ or more. In particular, the BET surface of the polymer particles is in the range from 100 $m^2/g$ to 7000 $m^2/g$, especially 150 to 6000 $m^2/g$, preferably 200 to 3000 $m^2/g$, especially preferably 225 to 2500 $m^2/g$, quite especially preferably 250 to 2000 $m^2/g$, even more preferably 275 to 1800 $m^2/g$.

Determination of the specific surface according to BET is basically well known per se by a person skilled in the art, so no further details regarding this are needed. All BET surface data relate to determination according to ASTM D6556-04. Moreover, in the context of the present invention, the so-called MultiPoint-BET (MP-BET) method of determination, which is quite familiar to a person skilled in the art, especially in a range of partial pressure $p/p_0$ from 0.05 to 0.1, is employed for determining the BET surface.

Moreover, for further details on determination of the BET surface or the BET method, reference may be made to the aforementioned ASTM D6556-04 and to Römpp Chemielexikon, 10th edition, Georg Thieme Verlag, Stuttgart/New York, Headword: "BET method", including the references given there, and to Winnacker-Küchler (3rd edition), Vol. 7, pages 93 ff. and to Z. Anal. Chem. 238, pages 187 to 193 (1968).

The weight-based and volume-based volume $V_{ads}$ ($N_2$) of the organic polymers used according to the invention at different partial pressures $p/p_0$ can also vary over a wide range:

Thus, the weight-based adsorbed $N_2$ volume $V_{ads(wt.)}$ of the organic polymers used according to the invention, determined at a partial pressure $p/p_0$ of 0.25, can be at least 50 $cm^3/g$, especially at least 100 $cm^3/g$, preferably at least 150 $cm^3/g$, especially preferably at least 200 $cm^3/g$, and in particular is in the range from 50 to 800 $cm^3/g$, preferably 100 to 750 $cm^3/g$, especially preferably 150 to 700 $cm^3/g$.

Generally, the volume-based adsorbed $N_2$ volume $V_{ads(vol.)}$ of the organic polymers used according to the invention, determined at a partial pressure $p/p_0$ of 0.25, is at least 50 $cm^3/cm^3$, especially at least 100 $cm^3/cm^3$, and in particular is in the range from 50 to 400 $cm^3/cm^3$, preferably 75 to 375 $cm^3/cm^3$, especially preferably 100 to 350 $cm^3/cm^3$.

Generally, the weight-based adsorbed $N_2$ volume $V_{ads(wt.)}$ of the organic polymers used according to the invention, determined at a partial pressure $p/p_0$ of 0.995, is at least 75 $cm^3/g$, especially at least 150 $cm^3/g$, preferably at least 200 $cm^3/g$, especially preferably at least 225 $cm^3/g$, and in particular is in the range from 75 to 900 $cm^3/g$, preferably 150 to 800 $cm^3/g$, especially preferably 175 to 750 $cm^3/g$ Generally, the volume-based adsorbed $N_2$ volume $V_{ads(vol.)}$ of the organic polymers used according to the invention, determined at a partial pressure $p/p_0$ of 0.995, is at least 75 $cm^3/cm^3$, especially at least 125 $cm^3/cm^3$, and in particular is in the range from 75 to 500 $cm^3/cm^3$, preferably 100 to 475 $cm^3/cm^3$, especially preferably 125 to 400 $cm^3/cm^3$.

According to a special embodiment of the present invention, after completion of poly(acetylcyclotrimerization) the organic polymers or the organic polymer particles can be modified, in particular by means of postcuring of the polymers (e.g. by Friedel-Crafts alkylation etc.) and/or by means of functionalization, preferably on the aromatics or polycycles (e.g. nitration of the aromatics followed by reduction to the amine or followed by azo coupling etc.) and/or on optionally still present, especially terminal acetyl groups (e.g. reduction of the carbonyl groups). In this way, improved or tailored application properties can be obtained. For example, after completion of poly(acetylcyclotrimerization), the organic polymers or the organic polymer particles can be submitted for this purpose to postcuring or so-called hypercrosslinking, preferably by Friedel-Crafts alkylation (e.g. by preliminary swelling of the polymers with a suitable solvent, e.g. dichloroethane, followed by the actual Friedel-Crafts alkylation, e.g. with $CH_2(OCH_3)_2$ in the presence of a suitable catalyst, e.g. $FeCl_3$); in this way, for example the specific surfaces of the polymers can be increased significantly, and this operation can also be carried out repeatedly. Equally, however, it is also possible for the organic polymers or the organic polymer particles to be submitted, after completion of poly(acetylcyclotrimerization), to a functionalization, e.g. on the aromatics or polycycles (e.g. nitration of the aromatics followed by reduction to the amine or followed by azo coupling etc.) and/or on optionally still present, especially terminal acetyl groups (e.g. reduction of the carbonyl groups). However, two or more of the aforementioned modifications of the polymers can also be carried out. On the whole, in this way modified, especially adapted and/or tailored application properties of the polymers used according to the invention are obtained.

Furthermore, the polymer particles used according to the invention have good gas storage and/or gas loading capacities, especially with respect to hydrogen, hydrocarbons, e.g. methane, and the like. In particular, at a pressure of 1 bar and a temperature of 77 K, the polymer particles used according to the invention have a hydrogen storage and/or hydrogen loading capacity from 0.1 to 50 wt %, especially 0.2 to 30 wt %, preferably 0.5 to 25 wt %, relative to the polymer particles.

According to a special embodiment of the present invention, in the unit according to the present invention, the porous, organic polymer particles used according to the invention can be used together with, or combined with, another different particulate porous material, especially adsorbent. This further material can in particular be a material from the group of activated charcoal, especially granular activated charcoal, preferably spherical activated charcoal; zeolites; porous metal oxide and/or metal particles; ion exchange resins; inorganic oxides, especially silicon dioxides, silica gels and/or aluminum oxides; porous organic-inorganic hybrid polymers; organometallic structured materials, especially MOFs (metal organic frameworks); mineral granules; clathrates; and mixtures and/or combinations thereof. Especially preferably, the further material can be activated charcoal, especially in granular form, preferably in spherical form, especially preferably with particle diameters in the range from 0.0001 to 5 mm, especially 0.001 to 2 mm. In this way the performance of the unit according to the invention can be further increased, as in this way materials with different properties—organic polymer particles used according to the invention on the one hand and particles of the further material on the other hand—are combined in a single unit.

In the context of the present invention, a new class of porous, especially microporous, purely organic OFC-based network compounds is thus provided, which are synthesized via a polycyclotrimerization reaction of polyfunctional acetyl compounds and have large BET specific surfaces and moreover possess a highly hydrophobic surface, which makes them of interest in particular for the adsorption of preferably nonpolar substances. These amorphous, porous polymer materials or particles are thermally stable up to temperatures of about 300° C. or even more and do not display any decomposition phenomena in an aqueous environment, which makes easy handling possible. The OFCs are easily accessible by synthesis and, owing to their chemical and thermal stability, offer versatile possible applications, for example in adsorptive separation processes (e.g. in filtration, gas scrubbing, gas storage etc.).

The polycyclotrimerization described above leads to the linking of polyfunctional organic linker molecules or educt molecules, so that covalent organic networks are obtained, with cleavage of water molecules. The cyclotrimerization reaction of acetylated aromatic compounds has until now been used in the literature only for the synthesis of relatively small molecules, whose center is a 1,3,5-substituted phenylene ring, but not for constructing porous polymer networks. The trigonal symmetry achieved by cyclotrimerization is in fact important for the construction of new linker molecules, especially for novel porous polymers of modular construction. The reaction is acid-catalyzed and can for example be carried out—depending on the educts—e.g. with potassium pyrosulfate and catalytic amounts of concentrated sulfuric acid in a solid-state reaction, or alternatively e.g. with Lewis acids, for example $FeCl_3$, $AlCl_3$, $TiCl_4$, $TiCl_3(OTf)$ etc., in solution or with hydrogen chloride produced in situ from the hydrolysis of $SiCl_4$ with ethanol.

Figure 2A:
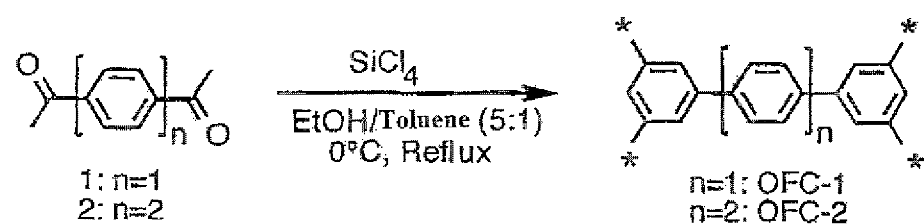
FIGS. 2A to 2C provides schematically, the reaction sequence for production of the OFC materials characterized in more detail in the practical examples: OFC-1 and OFC-2 (cf.
Figure 2B:
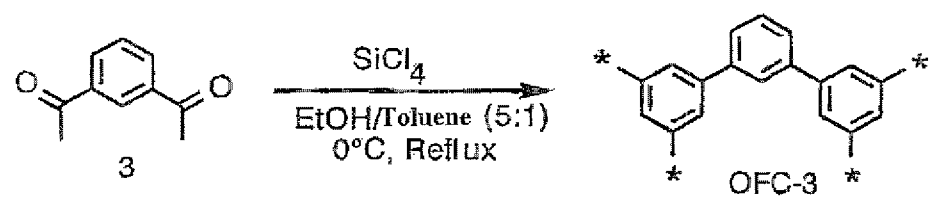
Figure 2C:
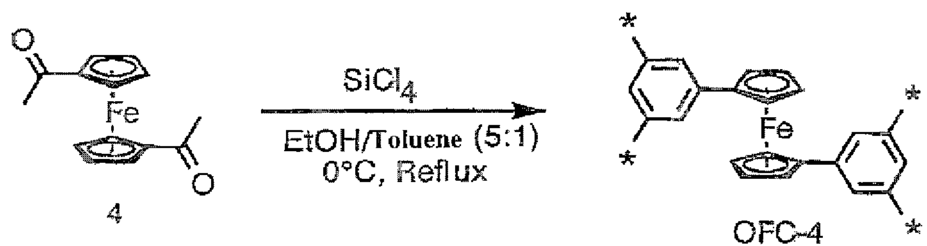
Figure 3:
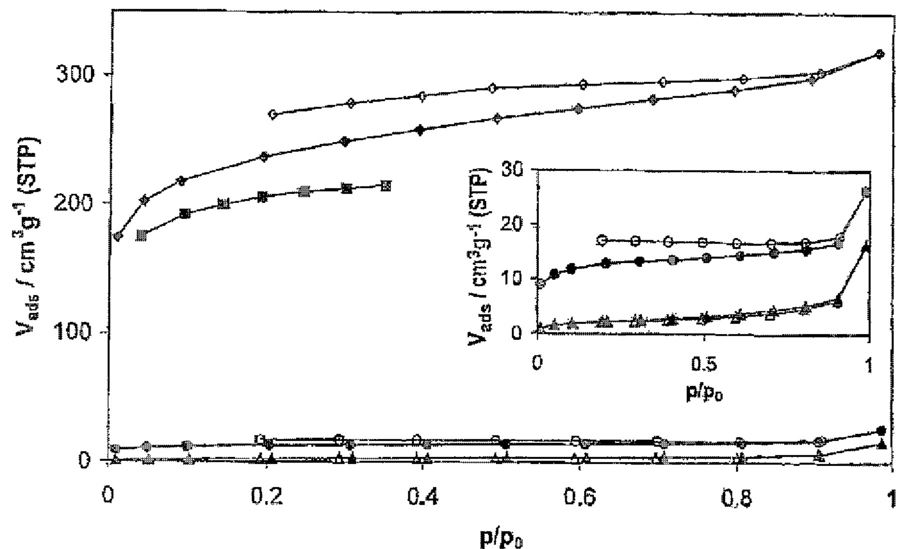
FIG. 3 illustrates the $N_2$ physisorption of the OFC materials characterized in more detail in the practical examples: OFC-1 (rhombus), OFC-2 (square), OFC-3 (triangle) and OFC-4 (circle) at 77 K, wherein filled symbols relate to adsorption and empty symbols relate to desorption and the inset relates to the increase for OFC-3 and OFC-4.
Figure 4:
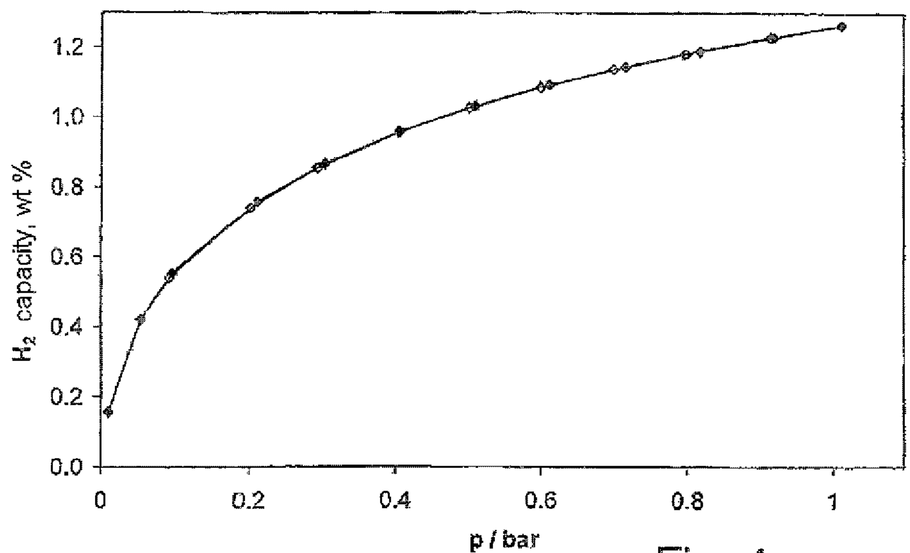
FIG. 4 illustrates the $H_2$ physisorption of the OFC material characterized in more detail in the practical examples, OFC-1, at 77 K.
Figure 5:
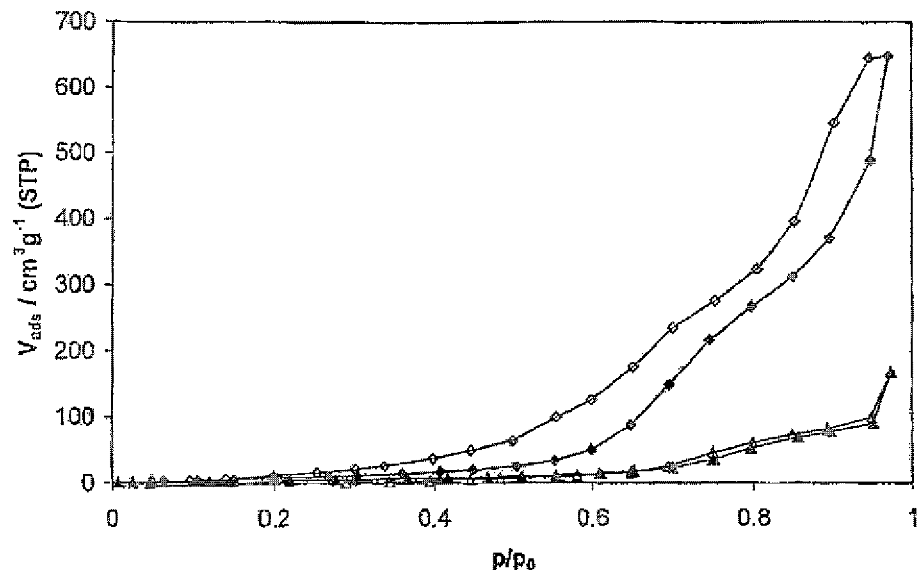
FIG. 5 illustrates the $H_2O$ physisorption of the OFC materials characterized in more detail in the practical examples, OFC-1 (rhombus) and OFC-2 (triangle) at 298 K, in which filled symbols relate to adsorption and empty symbols to desorption.
Figure 6:
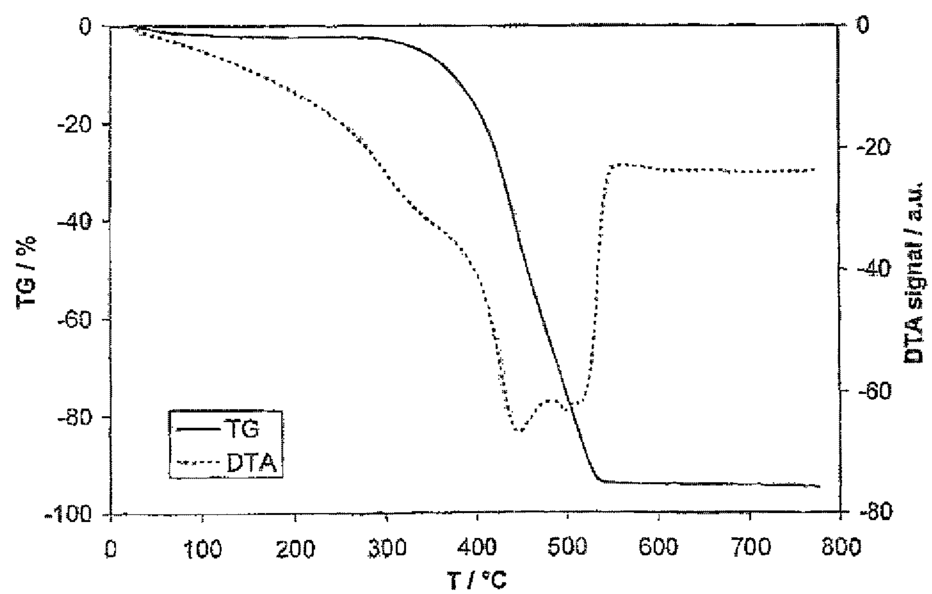
FIG. 6 provides the curves obtained by DTA/TG (differential thermal analysis/thermogravimetry) for the OFC material OFC-1 characterized in more detail in the practical examples, in air.
Figure 7:
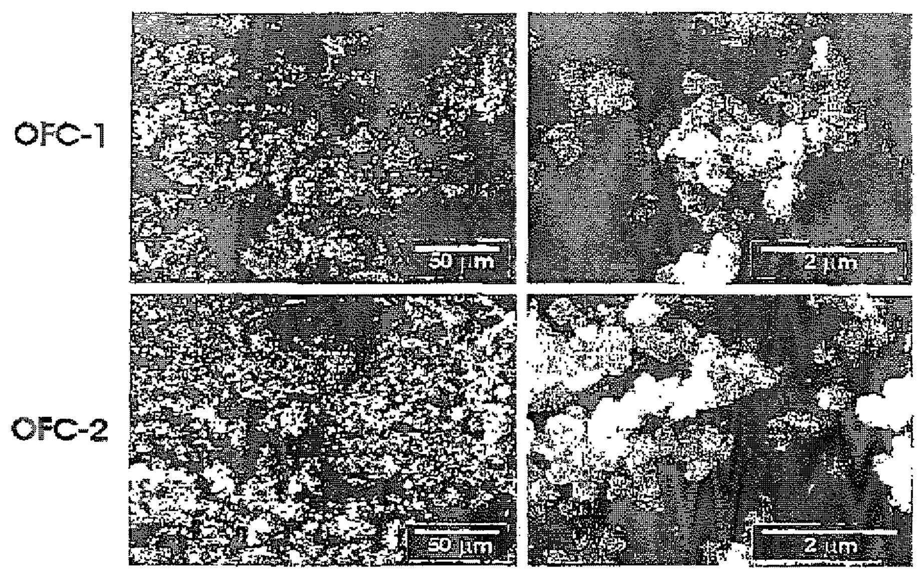
FIG. 7 provides SEM images of the OFC materials characterized in more detail in the practical examples: OFC-1 (top) and OFC-2 (bottom) at 500× and 20,000× magnification (left and right)
Figure 8:
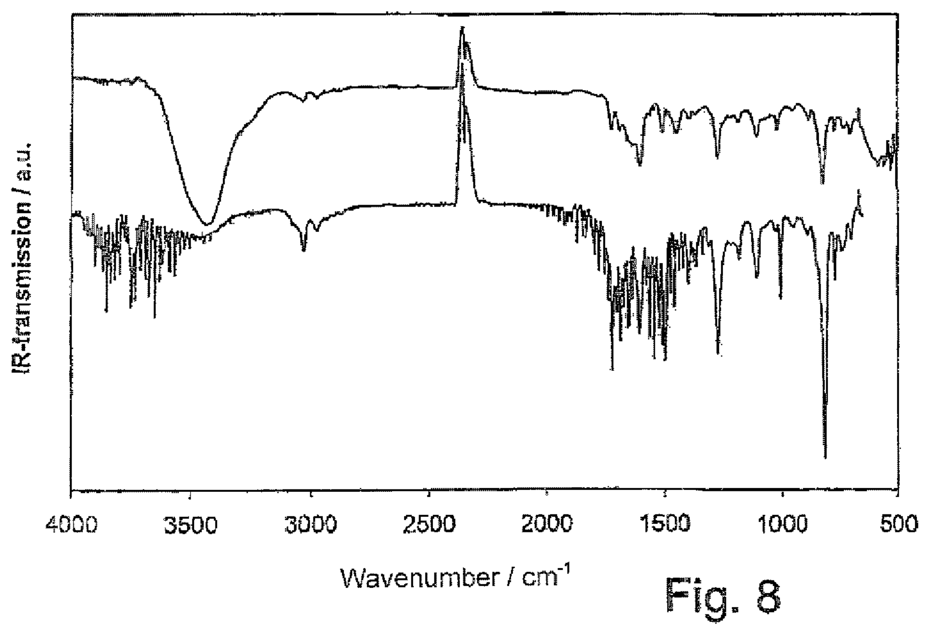
FIG. 8 provides the FT-IR spectrum of the OFC materials characterized in more detail in the practical examples: OFC-1 (top) and OFC-2 (bottom)
Figure 9:
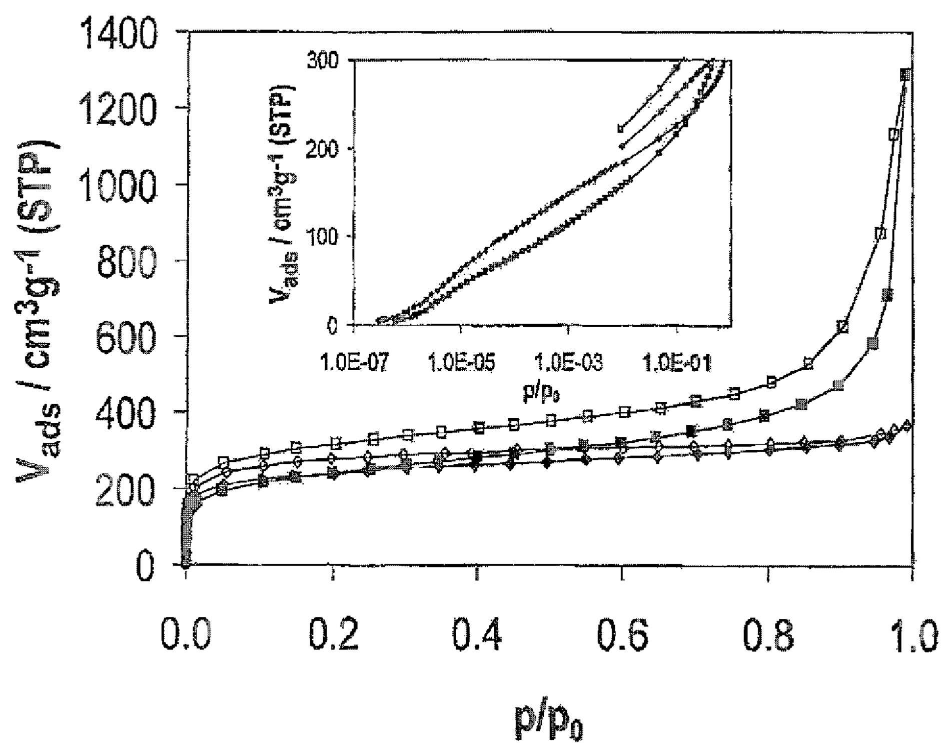
FIG. 9 provides the physisorption isotherms at 77 K of the OFC materials characterized in more detail in the practical examples: OFC-1A (rhombus) and OFC-1B (squares), in which filled symbols relate to adsorption and empty symbols to desorption and the inset shows the logarithmic plot of the low pressure region.
Figure 10:
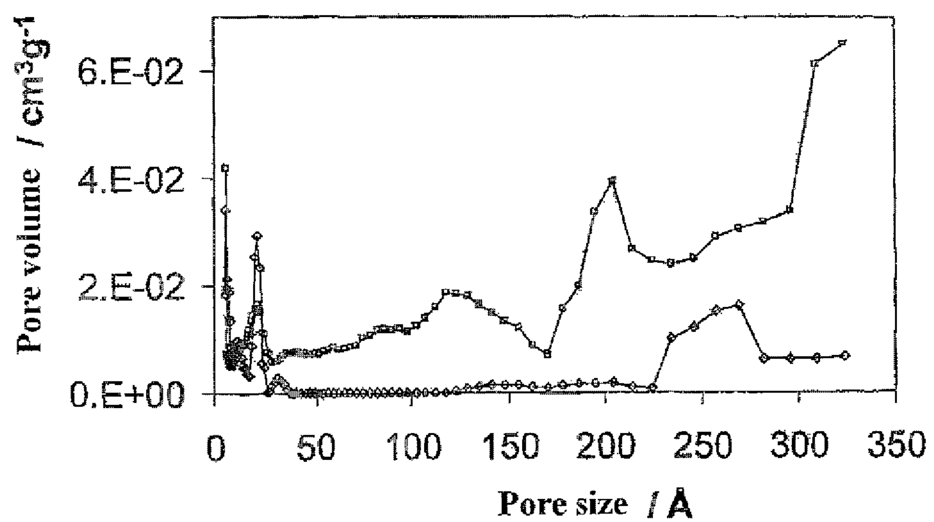
FIG. 10 illustrates the pore size distribution, determined by the QSDFT method, of the OFC materials characterized in more detail in the practical examples: OFC-1A (rhombus) and OFC-1B (squares).

Further advantages, features, properties and aspects of the present invention can also be seen in the appended drawings, showing:

FIGS. 1A to 1C starting compounds or educt molecules ("linkers") usable according to the invention for the production of the porous organic polymers usable in the unit according to the invention, wherein in the formulas shown in FIGS. 1A to 1C the residue "Ac" denotes an acetyl group $CH_3$—C(O)— and the residue "R", in each case independently (i.e. therefore also possibly with various meanings within the same molecule), denotes hydrogen or an organic residue, selected in particular from the group of alkyl, alkenyl, alkynyl, alkoxy and aryl, a halogen or an amine group, wherein FIG. 1A shows bifunctional linker molecules, whereas FIGS. 1B and 1C show trifunctional or tetrafunctional linker molecules, respectively;

FIGS. 2A to 2C schematically, the reaction sequence for production of the OFC materials characterized in more detail in the practical examples: OFC-1 and OFC-2 (cf. FIG. 2A), OFC-3 (cf. FIG. 2B) and OFC-4 (FIG. 2B), wherein the symbol "*" in each case indicates the repeating units;

FIG. 3 the $N_2$ physisorption of the OFC materials characterized in more detail in the practical examples: OFC-1 (rhombus), OFC-2 (square), OFC-3 (triangle) and OFC-4 (circle) at 77 K, wherein filled symbols relate to adsorption and empty symbols relate to desorption and the inset relates to the increase for OFC-3 and OFC-4;

FIG. 4 the $H_2$ physisorption of the OFC material characterized in more detail in the practical examples, OFC-1, at 77 K;

FIG. 5 the $H_2O$ physisorption of the OFC materials characterized in more detail in the practical examples, OFC-1 (rhombus) and OFC-2 (triangle) at 298 K, in which filled symbols relate to adsorption and empty symbols to desorption;

FIG. 6 the curves obtained by DTA/TG (differential thermal analysis/thermogravimetry) for the OFC material OFC-1 characterized in more detail in the practical examples, in air;

FIG. 7 SEM images of the OFC materials characterized in more detail in the practical examples: OFC-1 (top) and OFC-2 (bottom) at 500× and 20,000× magnification (left and right);

FIG. 8 the FT-IR spectrum of the OFC materials characterized in more detail in the practical examples: OFC-1 (top) and OFC-2 (bottom);

FIG. 9 the physisorption isotherms at 77 K of the OFC materials characterized in more detail in the practical examples: OFC-1A (rhombus) and OFC-1B (squares), in which filled symbols relate to adsorption and empty symbols to desorption and the inset shows the logarithmic plot of the low pressure region;

FIG. 10 the pore size distribution, determined by the QSDFT method, of the OFC materials characterized in more detail in the practical examples: OFC-1A (rhombus) and OFC-1B (squares).

According to a further aspect of the present invention, the present invention further relates to the use according to the invention of the unit according to the present invention, as was described above, for filtration, for gas scrubbing, for catalysis, for gas storage or for sorption, especially adsorption, preferably of gases.

In this connection, for example the unit according to the invention can be used for the filtration of fluid or gaseous media, for example for the purpose of removing harmful, odoriferous or toxic substances. Furthermore, it is possible to use the unit according to the invention for gas scrubbing, especially for the purification of air streams. Owing to the porosity of the polymer particles used according to the invention, the unit according to the invention is also suitable for catalysis, especially heterogeneous catalysis, for example as carrier material for catalysts, especially supported catalyst systems. Furthermore, owing to the porosity of the polymer particles used according to the invention, the unit according to the invention can also be used for gas storage, for example for storing hydrogen, hydrocarbons, e.g. methane, or other gases, e.g. nitrogen etc. Furthermore, according to this aspect according to the invention, the unit according to the invention can also be used for sorption, especially adsorption, preferably of gases (e.g. far the adsorptive separation or removal of gases or gas mixtures).

For further details on this aspect of the invention, reference may be made to the above statements regarding the unit according to the invention, which also apply correspondingly in relation to this aspect of the invention.

According to yet another aspect of the present invention, the present invention further relates to the use of the unit according to the invention described above in filters and filter materials, especially textile filters and filter materials, in gas scrubbing devices, in catalysts, in gas storage tanks or in protective clothing, especially ABC protective clothing.

For further details on this aspect of the invention, reference may be made to the above statements regarding the other aspects according to the invention, which also apply correspondingly in relation to this aspect of the invention.

Yet another object of the present invention relates to the use of a unit according to the invention as described above for removing harmful, odoriferous and toxic substances of all kinds, especially from air and/or gas streams, preferably in ABC protective-mask filters, odor filters, surface filters, air filters, especially filters for room-air purification, adsorptive carrier structures and filters for the medical area.

For further details on this aspect of the invention, reference may be made to the above statements regarding the other aspects according to the invention, which also apply correspondingly in relation to this aspect of the invention.

Finally, yet another object of the present invention relates to filters and filter materials, especially textile filters and filter materials, gas scrubbing devices, catalysts, gas storage tanks or protective clothing, especially ABC protective clothing, which are in each case produced using a unit according to the invention as described above or which in each case have a unit according to the invention as described above.

For further details on this aspect of the invention, reference may be made to the above statements regarding the other aspects according to the invention, which also apply correspondingly in relation to this aspect of the invention.

Further configurations, modifications and variations of the present invention can readily be recognized and carried out by a person skilled in the art on reading the description, while remaining within the scope of the present invention.

The present invention is illustrated with the following practical examples, but these are not intended to limit the present invention in any way.

EXAMPLES

General

All chemicals are obtainable from Sigma Aldrich, Acros Organics or Alfa Aesar and are used in unaltered form. Only dried or absolute solvents are used, which are stored under argon atmosphere and over a molecular sieve.

Synthesis of OFC-1

Under a dynamic argon atmosphere, 0.4 g (2.46 mmol) of 1,4-diacetylbenzene is put in a 250-ml three-necked flask and is dissolved in 100 ml ethanol and 20 ml toluene. At a temperature of 0° C., 28.2 ml (246 mmol) of silicon tetrachloride are added dropwise. After stirring for 30 min, the mixture is heated slowly and at about 110° C. is boiled under reflux for four hours. The reaction is stopped by adding saturated ammonium chloride solution. The resultant precipitate is filtered with suction and is washed with water, concentrated sodium hydroxide solution, water (until a pH of 7 is reached) and ethanol, three times in each case. The product is dried under vacuum. The reaction is shown schematically in FIG. 2A (n=1), in which the symbol "*" indicates the repeating units.

Synthesis of OFC-2

Under a dynamic argon atmosphere, 0.2 g (0.84 mmol) of 4,4'-diacetylbiphenyl is put in a 100-ml three-necked flask and is suspended in 40 ml ethanol and 8 ml toluene. At a temperature of 0° C., 9.6 ml (84 mmol) of silicon tetrachloride are added dropwise, and the educt dissolves. After stirring for 30 min, the mixture is heated slowly and at about 110° C. is boiled under reflux for four hours. The reaction is stopped by adding saturated ammonium chloride solution. The resultant precipitate is filtered with suction and is washed with water, concentrated sodium hydroxide solution, water (until a pH of 7 is reached), acetone and ethanol, three times in each case. The product is dried under vacuum. The reaction is shown schematically in FIG. 2A (n=2), in which the symbol "*" indicates the repeating units.

Synthesis of OFC-3

Under a dynamic argon atmosphere, 0.2 g (1.23 mmol) of 1,3-diacetylbenzene is put in a 100-ml three-necked flask and is dissolved in 40 ml ethanol and 8 ml toluene. At a temperature of 0° C., 14.1 ml (123 mmol) of silicon tetrachloride are added dropwise. After stirring for 40 min, the mixture is heated slowly and at about 110° C. is boiled under reflux for two hours. The reaction is stopped by adding saturated ammonium chloride solution. The resultant precipitate is filtered with suction and is washed with water, concentrated sodium hydroxide solution, water (until a pH of 7 is reached) and ethanol, three times in each case. The product is dried under vacuum. The reaction is shown schematically in FIG. 2B, in which the symbol "*" indicates the repeating units.

Synthesis of OFC-4

Under a dynamic argon atmosphere, 0.2 g (0.74 mmol) of 1,1'-diacetylferrocene is put in a 100-ml three-necked flask and is dissolved in 40 ml ethanol and 8 ml toluene. At a temperature of 0° C., 8.5 ml (74.0 mmol) of silicon tetrachloride are added dropwise. After stirring for 20 min, the mixture is heated slowly and at about 110° C. it is boiled under reflux for 24 h. The reaction is stopped by adding saturated ammonium chloride solution. The resultant precipitate is filtered with suction and washed with water and ethanol, three times in each case. The product is dried under vacuum. The reaction is shown schematically in FIG. 2C, in which the symbol "*" indicates the repeating units.

Characterization

Nitrogen physisorption was measured on NOVA 2000 and AUTOSORB 1-C at 77 K. Hydrogen physisorption was also carried out on AUTOSORB 1-C at 77 K, and water vapor physisorption on HYDROSORB 1000 at 298 K. All the aforementioned adsorption instruments are from the company Quantachrom. Directly before the adsorption measurements, each sample was activated for at least five hours at 150° C. under vacuum.

FT-IR spectra were recorded on the Magna-IR 550 Series II FT-IR spectrometer from the company Nicolet.

Elemental analyses were performed as combustion analyses at the Institute for Organic Chemistry of Dresden Technical University with the instrument EA 3000 Euro Vector CHNSO Elemental Analyzer from the company Hekatech.

The thermal analysis measurements (DTA/TG, differential thermal analysis/thermogravimetry) were performed at the Institute for Inorganic Chemistry on the Simultaneous Thermal Analyzer STA 409 from the company Netzsch.

Results and Discussion

All the variants stated in the description lead to the desired cyclotrimerization and to the formation of an insoluble polymer network. In particular the reaction with a catalyst system based on silicon tetrachloride in ethanol leads to particularly good results. In all cases there is formation of porous, especially highly microporous polymer networks which, in contrast to other networks known in the prior art, do not have an ordered structure. The reason for this is the kinetically controlled reaction pathway. The aromatic phenylene rings form with cleavage of water molecules, which in the given reaction conditions is not a thermodynamically controlled equilibrium reaction. Furthermore, phenylene rings are the most stable aromatic structures that are known.

Optimization of the Synthesis Conditions

The synthesis conditions of the new materials were optimized with respect to the size of the specific surface, on the basis of the synthesis of OFC-1. For this, mainly the influence of the solvent, the amount of $SiCl_4$ added and the dependence on the synthesis temperature were investigated.

Characterization of the Porosity and Physisorption Properties

For characterization of the porosity, the nitrogen physisorption at 77 K was measured for all samples (cf. FIG. 3). FIG. 3 shows the $N_2$ physisorption of OFC-1 (rhombus), OFC-2 (square), OFC-3 (triangle) and OFC-4 (circle) at 77 K, wherein filled symbols relate to adsorption and empty symbols to desorption; the inset relates to the increase for OFC-3 and OFC-4.

All the compounds (OFC-1 to OFC-4) are microporous. There are isotherms present as a mixture of type I and II according to the IUPAC classification. After adsorption in the micropores at very low relative pressure, the isotherms show a continuous increase, which can be attributed to adsorption on the external surface of very small particles. The slight increase at a relative pressure $p/p_0>0.9$ indicates nitrogen condensation in macropores or in spaces between particles. The desorption forms a hysteresis over the entire range of relative pressure. This effect is characteristic of disordered porous polymers and is attributed to dynamic behavior of the compounds, which is manifested as swelling of the network by condensed adsorbate. The isotherms were evaluated according to BET theory and t-plot micropore analysis (cf. Table 1).

TABLE 1

Specific surface, external surface and micropore volume from nitrogen physisorption at 77 K

| | $S_{SPBET}$ ($p/p_0$ = 0.3)/ $m^2g^{-1}$ | $S_{extern}$ (t-plot)/ $m^2g^{-1}$ | $V_{micro}$ (t-plot)/ $cm^3g^{-1}$ ($p/p_0$ = 0.2) |
|---|---|---|---|
| OFC-1 | 772 | 63 | 0.38 |
| OFC-2 | 650 | 72 | 0.32 |

A good hydrogen storage capacity is observed. For OFC-1, the hydrogen physisorption was measured at 77 K (cf. FIG. 4, which shows the $H_2$ physisorption of OFC-1 at 77 K). The compound possesses a hydrogen storage capacity of 1.26 wt % at a pressure of 1 bar, and saturation is still not reached, and so an even higher capacity can be reached at higher pressure.

As the networks are, to a first approximation, constructed exclusively from aromatic 1,4- and 1,3,5-substituted phenylene rings, they have an extremely nonpolar surface. This behavior was confirmed for OFC-1 and OFC-2 by means of water vapor physisorption at 298 K (cf. FIG. 5, illustrating the $H_2O$ physisorption of OFC-1 (rhombus) and OFC-2 (triangle) at 298 K, in which filled symbols relate to adsorption and empty symbols to desorption). At low relative pressure, no adsorption occurs. It is only starting from $p/p_0$=0.6 for OFC-1 and $p/p_0$=0.7 for OFC-2 that water vapor is adsorbed in the pores. The complete desorption of water and the fact that the compounds had already been washed with water during preparation indicate very good resistance to hydrolysis. After the stated adsorption at medium relative pressure, another adsorption step can be seen at very high relative pressure, indicating condensation of water in the measuring cell. For comparison with the micropore volumes from $N_2$ physisorption (cf. Table 2), the pore volume was determined from the amount of adsorbed water before condensation in the measuring cell at $p/p_0$=0.85.

TABLE 2

| Comparison of pore volumes from $N_2$ and $H_2O$ physisorption | | |
|---|---|---|
| | OFC-1 | OFC-2 |
| $V_{micro}$ ($N_2$)/$cm^3g^{-1}$ | 0.38 | 0.32 |
| $V_{total}$ ($H_2O$)/$cm^3g^{-1}$ | 0.25 | 0.06 |

The pore volume calculated from the total quantity of adsorbed water molecules is 34% less in the case of OFC-1 and even 81% less in the case of OFC-2 than the micropore volume determined from nitrogen physisorption, which is a further indication of an extremely hydrophobic internal surface, especially in the case of OFC-2. The water is adsorbed preferentially on the few polar centers on the surface, so that the polar "surface" increases due to growing aggregations of water molecules. Owing to this growth, the nonpolar surface is bridged ("bridging effect"), until finally condensation occurs inside the pores. The residual free pore space directly above the nonpolar surface leads to the smaller pore volume in contrast to the pores completely filled with nitrogen molecules.

Characterization of the Composition and Structure

The compound OFC-1 was investigated with respect to its thermal stability using DTA/TG (cf. FIG. 6). A decomposition is observed starting from a temperature of 300° C. The DTA signal shows several maxima at 450° C. and in the region around 500° C. The first stage of decomposition is attributed to the combustion of organic groups that are not linked into the network and partially penetrate the pore space, e.g. diacetylbenzene cyclotrimerized on only one side. In the second stage, the structure-forming organic material is then decomposed. Theoretically, complete combustion of the compound would be expected, but there is a residue of approx. 5.3 wt %. This residue can presumably be attributed to $SiO_2$, which was formed as silicic acid when the reaction was stopped with aqueous ammonium chloride solution, and could not be removed completely from the network during washing with sodium hydroxide solution.

Using EDX studies of OFC-1 and OFC-2 (cf. Table 3), it was shown that the proportions of carbon by weight in both compounds are in agreement with the theoretically calculated values. Apart from carbon as the main constituent of the networks, it was possible to detect oxygen from the aforementioned $SiO_2$ or from unreacted acetyl groups, and nitrogen from ammonium chloride that had not been washed out completely. In OFC-1, in addition traces of sodium were also discovered, from which it can be concluded that there are residues of NaOH, whereas very small amounts of silicon were detected in OFC-2.

TABLE 3

Results of EDX analysis of OFC-1 and OFC-2; N was not detected directly (values: measured/theoretical)

| OFC-1 | | | OFC-2 | | |
|---|---|---|---|---|---|
| Element | atom-% | wt % | Element | atom-% | wt % |
| C | 97.08/62.50 | 96.45/95.20 | C | 97.65/61.54 | 96.95/95.02 |
| O | 0.63/— | 0.83/— | O | 0.80/— | 1.06/— |
| N | 2.22/— | 2.58/— | N | 1.56/— | 1.81/— |
| Na | 0.08/— | 0.14/— | Na | — | — |
| Si | — | — | Si | 0.08/— | 0.18/— |

In order to obtain more precise information about the composition of the compounds, elemental analyses were also carried out in the form of combustion analyses.

Scanning electron micrographs of powder samples of OFC-1 and OFC-2 show fine, partially aggregated or intergrown particles (cf. FIG. 7, which shows SEM images of OFC-1 (top) and OFC-2 (bottom) at 500× and 20,000× magnification (left and right)). For both compounds, at 20,000× magnification the size of individual particles can be determined approximately. This gives a diameter of about 400 to 500 nm for the highly aggregated particles.

To obtain information about the structure of OFC-1 and OFC-2, the compound was investigated using FT-IR spectroscopy. In the FT-IR spectra (cf. FIG. 8, which shows the FT-IR spectrum of OFC-1 (top) and OFC-2 (bottom)), it is mainly the bands in the range 3000 to 3050 $cm^{-1}$ that are important, which are brought about by C—H stretching vibrations in aromatic rings, from which the polymers are mainly constructed. In the adjacent region from 2940 to 2990 $cm^{-1}$, very weak bands can be seen, indicating aliphatic C—H stretching vibrations. This is another indication of unreacted acetyl groups, as these contain aliphatic methyl groups. The associated vibration of the carbonyl group (C═O) is indicated by the band at 1720 $cm^{-1}$. In both spectra, at approx. 820 $cm^{-1}$ there is a very strong, narrow band, which is typical of 1,3,5- and 1,4-substituted phenylene rings. Both substitution patterns can be identified from the distribution of the bands in the fingerprint region.

Use of the OFC Materials According to the Invention for Production in Gas Storage Tanks The porous organic OFC polymers described above, of type OFC-1, OFC-2, OFC-3 or OFC-4, are used as a gas storage medium for hydrogen. For this purpose, they are fixed on a compressed three-dimensional foam carrier using a binder, and the resultant composite of foam with polymer fixed on it is introduced into a gas storage tank. All materials have identical amounts of deposited OFC material. In a fifth batch, half of the OFC material of the OFC-1 type is replaced with a microporous activated charcoal in spherical form (average diameter: 0.01 mm) from the company AdsorTech GmbH, Premnitz, Germany. Then the hydrogen storage capacity or hydrogen loading capacity is determined at a pressure of 3 bar. For the material coated with OFC-1 or OFC-2 or OFC-3 or OFC-4 or OFC-1/activated charcoal, this is 2.1 wt % or 2.4 wt % or 2.7 wt % or 2.6 wt % or 5.9 wt %, respectively, in each case based on the total amount of adsorbent or sorption material (i.e. porous polymer or porous polymer plus activated charcoal). The values relate to temperatures of 77 K. The results show that the various units according to the invention have good hydrogen storage or hydrogen loading properties, which can be improved significantly by combination with another adsorbent (specifically here: activated charcoal).

Production of Textile Surface-Filter Materials

Five sorption filter materials are produced, using as carrier material in each case an air-permeable textile fabric in the form of an oleophobized and hydrophobized polyester cloth with a specific weight of approx. 70 $g/m^2$. In all four cases, particulate porous polymer particles of type OFC-1 or OFC-2 or OFC-3 or OFC-4 and in the fifth case a 50:50 mixture of OFC-1/microporous activated charcoal (spherical form, as described above) are used (amount applied in each case: approx. 35 wt % relative to the filter material). For this purpose, the agglomerated, granular or spherical particles are fixed on the carrier material with an adhesive (amount of adhesive applied in each case approx. 5 $g/m^2$) in dot-raster and uniform distribution. All OFC materials were provided beforehand with metal salt impregnation (Cu/Zn/Ag impregnation with approx. 3.9 wt % impregnation, relative to particles).

On all five filter materials, the respective barrier effects against mustard gas and soman are determined according to method 2.2 of CRDEC-SP-84010 in the context of the so-called convective flow test; for this purpose, at constant flow resistance, with a flow velocity of approx. 0.45 cm/s, an air stream containing mustard gas or soman is allowed to act upon the respective filter material and the breakthrough amount per unit area is determined after 16 hours (80% relative humidity of the air; 32° C.; 10·1 μl HD/12.56 $cm^2$ or 12·1 μl GD/12.56 $cm^2$). All materials gave values below 2 $\mu g/cm^2$ both for mustard gas and for soman, and the filter material with the combination of OFC material/activated charcoal showed the best values.

Moreover, all filter materials show protective action against microorganisms: in tests for verification of the biostatic properties according to ASTM E2149-01 with *Klebsiella pneumoniae* or *Staphylococcus aureus* (in each case 1.5 to $3.0 \cdot 10^5$ CFU/ml) the percentage reduction with respect to these two pathogens after 24 hours is above 90% for all the materials.

Further Syntheses and Investigations

The synthesis of OFC-1 via two different reaction pathways, on the one hand in ethanolic solution with $SiCl_4$ as powder (OFC-1A) and on the other hand in a melt as a monolith (OFC-1B), was also investigated, and the products were characterized.

Interesting results for OFC-1 were obtained by measuring $N_2$ adsorption in the low pressure range (cf. FIG. 9: FIG. 9 shows the physisorption isotherms at 77 K of OFC-1A (rhombus) and OFC-1B (squares), where filled symbols relate to adsorption and empty symbols to desorption and the inset shows the logarithmic plot of the low pressure range). Thus, both compounds OFC-1A and OFC-1B have similar specific surfaces of approx. 800 $m^2g^{-1}$ (SPBET 0.3) and almost identical micropore volumes of 0.38 $cm^3g^{-1}$ ($p/p_0$=0.2). However, they differ very markedly in adsorption at high relative pressure. The total pore volume of OFC-1A at $p/p_0$=0.99 is only 0.57 $cm^3g^{-1}$, whereas OFC-1B has a high proportion of macropores with a total pore volume of 1.99 $cm^3g^{-1}$.

This distribution can be confirmed by QSDFT analysis of the low pressure measurement (cf. FIG. 10: FIG. 10 shows the pore size distribution of OFC-A (rhombus) and OFC-1B (squares) determined by the QSDFT method). OFC-1A shows a wide micropore distribution and a fraction of mesopores at approx. 25 nm. In comparison, OFC-1B has a much wider distribution over the entire pore size range, which indicates a well-formed transport pore system. Both materials show a distinctive, relatively sharp peak at 2 nm. With a simulated dendrimer structure of the compound, this peak can be assigned to a medium pore size which is due to a network, and this can be confirmed by measuring the pores in the model.

Impregnation of Nonwovens with OFC-1

Impregnation of nonwovens with OFC-1 was tested on various materials. The best results were achieved with polypropylene nonwoven fabrics. Impregnation was carried out with an ethanolic solution of the educts. After drying, the nonwoven fabric was treated at 120° C. for 96 h and then excess educts were removed by Soxhlet extraction. A weight increase of 85% was observed.

Production of OFC-1 Spheres

Spheres of OFC-1 can be produced by suspension polymerization. For this, the solid educts 1,4-diacetylbenzene and 4-toluenesulfonic acid are heated in an inert liquid and stirred vigorously. The resultant suspension of a melt in a liquid leads to small bubbles, which polymerize with longer heating. The spheres that form can be separated by filtration and purified correspondingly by Soxhlet extraction. The best spheres were obtained from silicone oil as inert reaction medium. By washing with solvents, excess silicone oil can then be dissolved again and removed, so that porous spheres are obtained. It is thus possible to produce polymer spheres by suspension polymerization.

Other Investigations:

The synthesis of the compound OFC-1 was investigated in more detail; in the following reaction equation the symbol "*" indicates the repeating units:

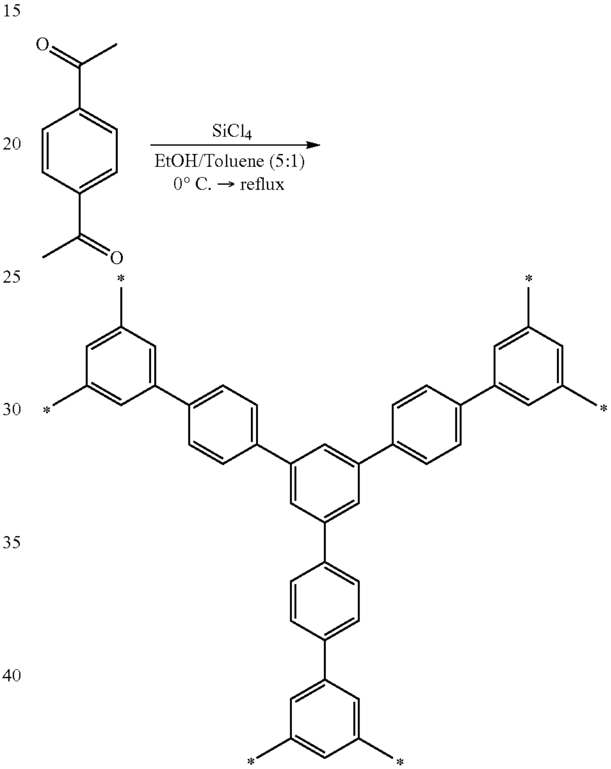

The reaction solution becomes darker and darker as $SiCl_4$ is added, until finally we have a dispersion of black particles. If it is then boiled under reflux, the precipitate becomes lighter, until finally a yellowish-orange product can be isolated. The darkening of the solution can be explained by particle growth of a polymer with a conjugated π system. Owing to the growing particles and therefore growing π system, the resultant band gap gets smaller and smaller (size quantization effect), so that in the case of the black intermediate we have a conductive product. The change from the black to the yellow product is reversible and can be attributed to HCl formed in situ, which is driven off by heating. If the yellow product is brought into contact with electrophilic substances, such as acids ($H^+$), or salts, e.g. $FeCl_3$ (Lewis acid), it immediately turns black, and in the case of acids the effect can easily be reversed by washing with water. The "doping" of the polymer with electrophiles corresponds to the doping of semiconductors with electron-deficient acceptors, which leads to a reduction of the band gap. Structurally, it can be assumed that in the polymer, instead of a cyclotrimerization, as a competing reaction only a dimerization takes place, so that there is conjugation of the π system via $sp^2$-hybridized carbon atoms, but a decrease in electron density on the carbonyl carbon atom due to electrophiles leads overall to a reduction of the band gap. If the polymer is treated with $FeCl_3$ solution in dichloroethane, the black product obtained can be isolated. The surface has decreased from 780 $m^2/g$ to approx. 360 $m^2/g$, which can be attributed to the weight increase and partially blocked pore volume. If the polymer is compacted into a solid tablet, a small conductivity can also be measured.

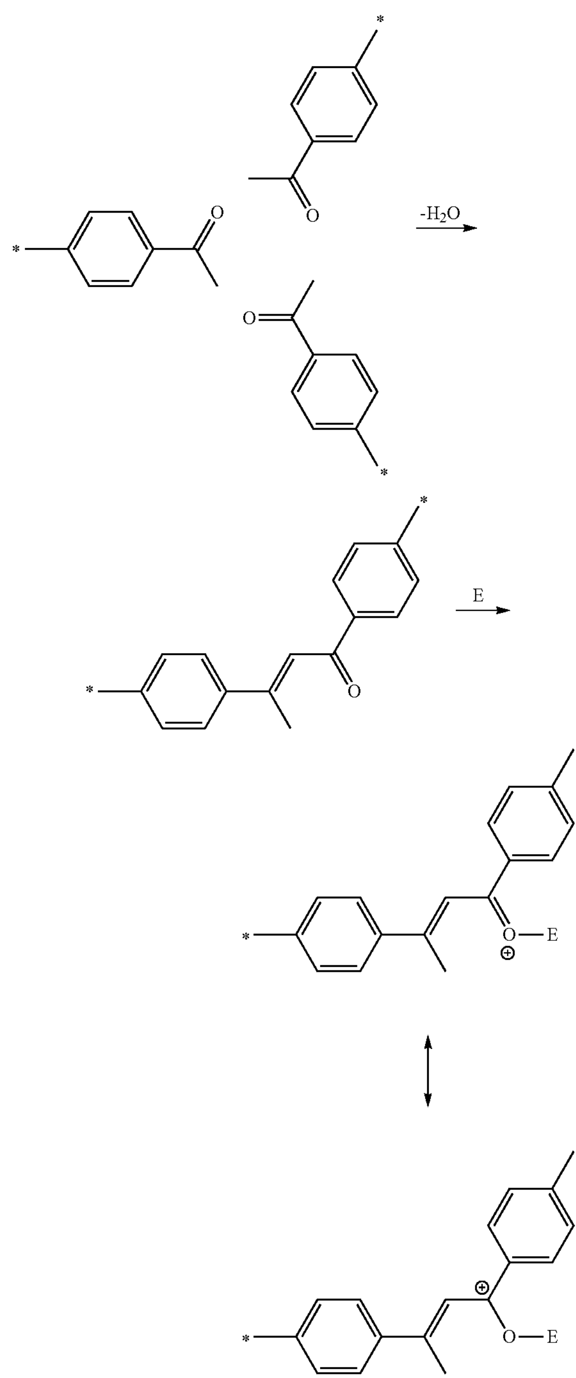

The various organic groups that form by cyclotrimerization and dimerization could be detected by FT-IR spectroscopy. A strong band at 827 $cm^{-1}$ shows the presence of 1,4-substituted phenylene rings, which occur most frequently, as they represent the educt. In addition, 1,3,5-substituted rings can be detected from the weak band at 709 $cm^{-1}$, which form due to the cyclotrimerization reaction. In addition, however, carbonyl groups (1722 $cm^{-1}$) and double bonds (DB, 1687 $cm^{-1}$) can also be discerned, with the double bonds only occurring if a dimerization has taken place. The compound OFC-1 consists of highly aggregated particles of approx. 500 nm diameter and is thermally stable in air up to about 300° C. As was shown by UV/VIS absorption spectroscopy, the yellow OFC-1 absorbs in the lower visual region with a maximum in the UV region at a wavelength of approx. 270 nm. It was shown for compounds with an organic basis and with similar absorption properties that there is photocatalytic activity. OFC-1 was investigated for similar properties on the basis of the photocatalyzed decomposition of methyl red in solution. A methyl red solution without OFC-1 was used as reference. Based on the UV-VIS spectra, it can be seen that there is definite photocatalytic activity of the material.

Functionalization of OFC-1

Reduction of the Carbonyl Groups

The compound OFC-1 is characterized by moderate hydrophobicity. The carbonyl groups that are sometimes present serve, owing to their polarity, as first adsorption sites for water molecules. This in turn leads to incipient water adsorption at a relative pressure of 0.6 and therefore roughly corresponds to the adsorption behavior of commercially available activated charcoals. By reduction of the carbonyl groups to methylene groups using the Wolff-Kishner reduction with hydrazine and direct reduction with hydrogen, it should be possible to make the internal surface more strongly nonpolar. However, this should also cause partial interruption of the conjugation of the $\pi$ system, as the carbonyl carbon atoms change their hybridization from $sp^2$ to $sp^3$. This effect can also be observed visually after the Wolff-Kishner reaction, because the polymer becomes much lighter and only has a faintly yellow coloration. The specific surface has decreased to 686 $m^2/g$. Reduction with hydrogen at 200° C. led to a minimal decrease in mass. In both cases the total amount of adsorbed water at $p/p_0$=0.97 drops by approx. 40%, so it can be concluded that the surface is more strongly nonpolar. However, no shift of adsorption to higher relative pressure is observed.

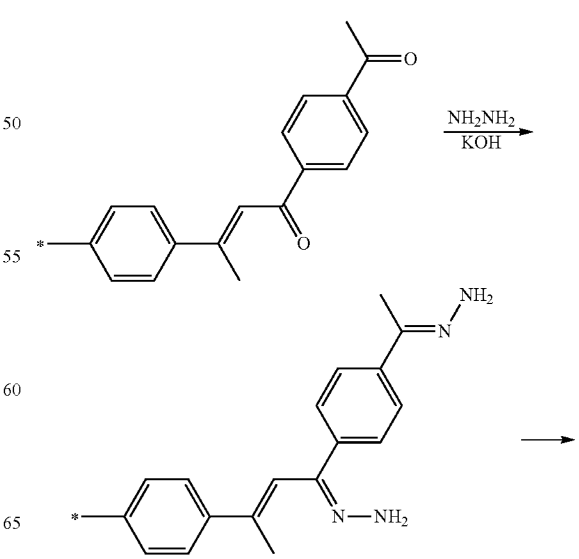

-continued

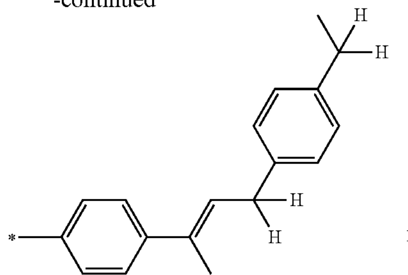

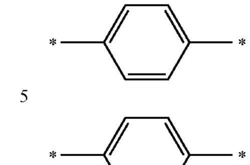

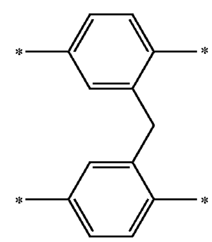

Nitration with Reduction to the Amine

Furthermore, the compound OFC-1 was functionalized in another way. Using nitrating acid, the aromatic rings could be nitrated at least partially. Successful nitration could be detected by IR spectroscopy. The nitro groups on the internal surface of OFC-1 were then reduced, to obtain amino groups for possible further functionalization. In addition, the nitro groups were used in the pores to achieve stronger conjugation of the π system and stronger crosslinking through reductive azo coupling. The functionalization was confirmed by IR spectroscopy.

Thermodynamic Investigations

In addition, thermodynamic investigations were conducted on a batch of OCF-1, as presented below:

Adsorbed $N_2$ volume $V_{ads(wt.)}$ ($p/p_0$=0.25): 232 $cm^3/g$
Adsorbed $N_2$ volume $V_{ads(wt.)}$ ($p/p_0$=0.995): 356 $cm^3/g$
Total Gurvich pore volume: 0.5514 $cm^3/g$

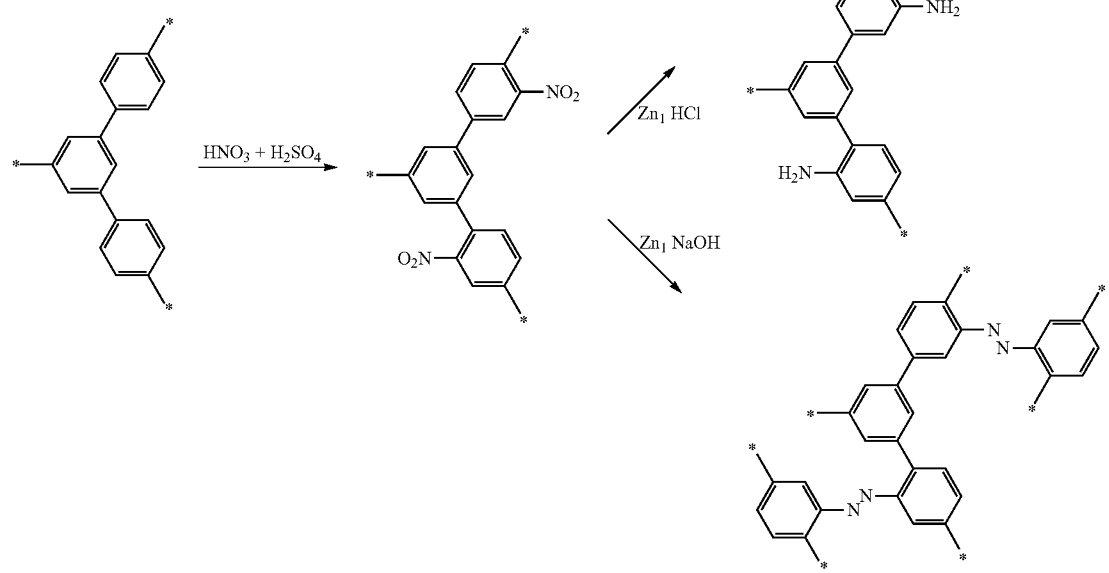

Hypercrosslinking (Postcuring)

Based on the principle of hypercrosslinked porous polymers, the compound OFC-1 was swollen in dichloroethane and then crosslinked by Friedel-Crafts alkylation. The swollen network was thus stabilized, and an increase in specific surface from 772 to 960 $m^2/g$ could be observed, wherein the hysteresis effect in the $N_2$ physisorption isotherm does not disappear, but is further increased. It is also possible to increase the surface area further by means of a second swelling and crosslinking.

BET surface (ASTM D6556-04): 822 $m^2/g$
Average pore diameter: 26.82 Å
Micropore volume (Carbon Black): 0.2548 $cm^3/g$
Micropore surface area (Carbon Black): 593 $m^2/g$
Loading capacity with neopentane at 24.3° C.:
Relative pressure 0.0005 bar: 4.03 wt %
Relative pressure 0.0040 bar: 6.83 wt %
Relative pressure 0.0650 bar: 13.52 wt %
Relative pressure 0.3012 bar: 24.00 wt %
Loading capacity with ammonia at 25.7° C.:
Relative pressure 0.0584 bar: 6.00 wt %
Relative pressure 0.4114 bar: 21.38 wt %

The invention claimed is:

1. A filter material comprising a unit, wherein the unit comprises a plurality of particles based on porous organic polymers, wherein the organic polymers are obtainable by poly(acetylcyclotrimerization) of polyacetyl-functionalized aromatics and/or polyacetyl-functionalized polycycles;

wherein the polymer particles are in powder form, in granular form or in the form of agglomerates, wherein the polymer particles or the agglomerates thereof have particle sizes in the range from 0.0001 μm to 10 mm; and wherein the polymer particles are applied on at least one support or are fixed thereto, wherein the support is selected from textile materials, support materials for catalysts, plastics, ceramic materials, metallic materials and combinations thereof.

2. The filter material as claimed in claim 1, wherein the poly(acetylcyclotrimerization) is carried out in the presence of a catalyst, wherein the catalyst used is selected from the group consisting of inorganic and organic acids and salts thereof, hydrogen halides, Lewis acids and mixtures and combinations thereof.

3. The filter material as claimed in claim 1, wherein the poly(acetylcyclotrimerization) is carried out as a solid-state or solid-phase reaction or as a reaction in the liquid phase.

4. The filter material as claimed in claim 1, wherein the poly(acetylcyclotrimerization) is carried out at temperatures in the range from −50° C. to 250° C. and at a pressure in the range from 0.01 to 50 bar absolute.

5. The filter material as claimed in claim 1, wherein the organic polymers have a nonlinear-crosslinked structure.

6. The filter material as claimed in claim 1, wherein the organic polymers have a large number of repeating structural units of the type of a 1,3,5-substituted phenyl radicals comprising at least one of aromatic and polycyclic residues in the 1-, 3- and 5-positions.

7. The filter material as claimed in claim 6, wherein the number of repeating structural units per polymer molecule is in the range from 25 to 10,000,000.

8. The filter material as claimed in claim 1, wherein the organic polymers have a large number of repeating structural units of the type

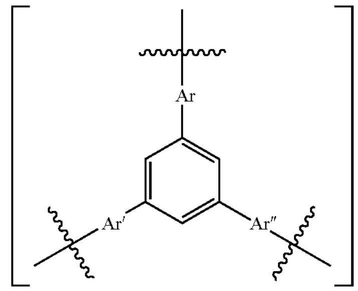

wherein the residues Ar, Ar' and Ar", independently of one another, denote an optionally substituted aromatic or polycyclic residue, wherein the number of repeating structural units per polymer molecule is in the range from 25 to 10,000,000.

9. The filter material as claimed in claim 1, wherein the organic polymers have a large number of repeating structural units of the type

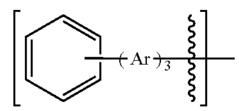

wherein the residue Ar denotes an optionally substituted aromatic or polycyclic residue, wherein the number of repeating structural units per polymer molecule is in the range from 25 to 10,000,000.

10. The filter material as claimed in claim 1, wherein the polyacetyl-functionalized aromatics or polycycles comprise at least two acetyl groups per molecule and/or wherein the polyacetyl-functionalized aromatics or polycycles are substituted with at least two acetyl groups.

11. The filter material as claimed in claim 1, wherein the polyacetyl-functionalized aromatics or polycycles are selected from the group consisting of the following compounds and combinations and mixtures thereof, wherein in the following formulas the residue "Ac" denotes an acetyl group $CH_3$—C(O)— and the residue "R", in each case independently, denotes hydrogen or an organic residue selected from the group consisting of alkyl, alkenyl, alkynyl, alkoxy and aryl, a halogen or an amine group:

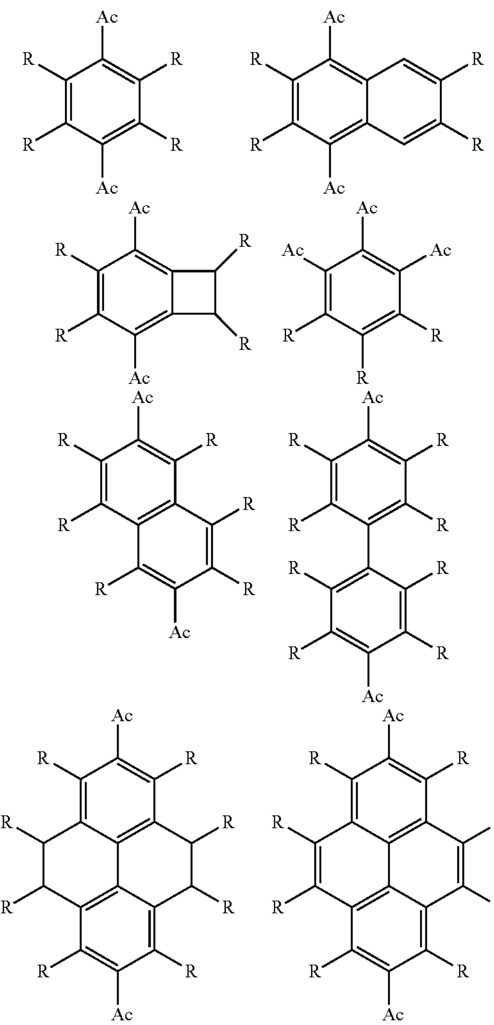

-continued
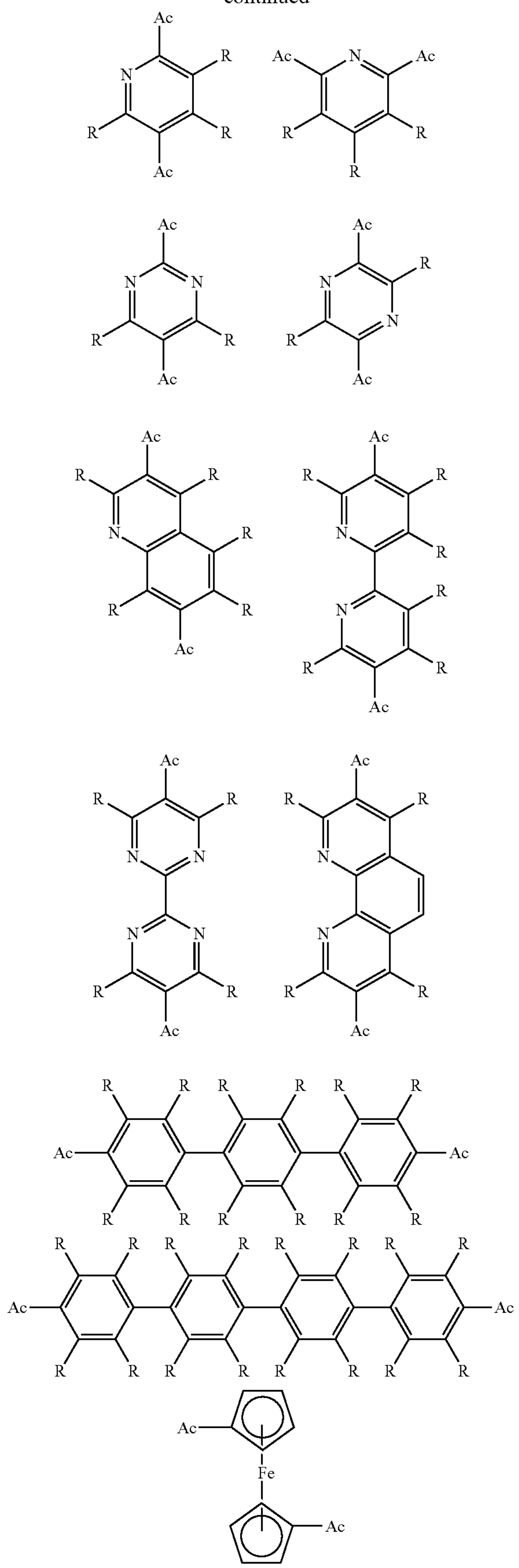
-continued
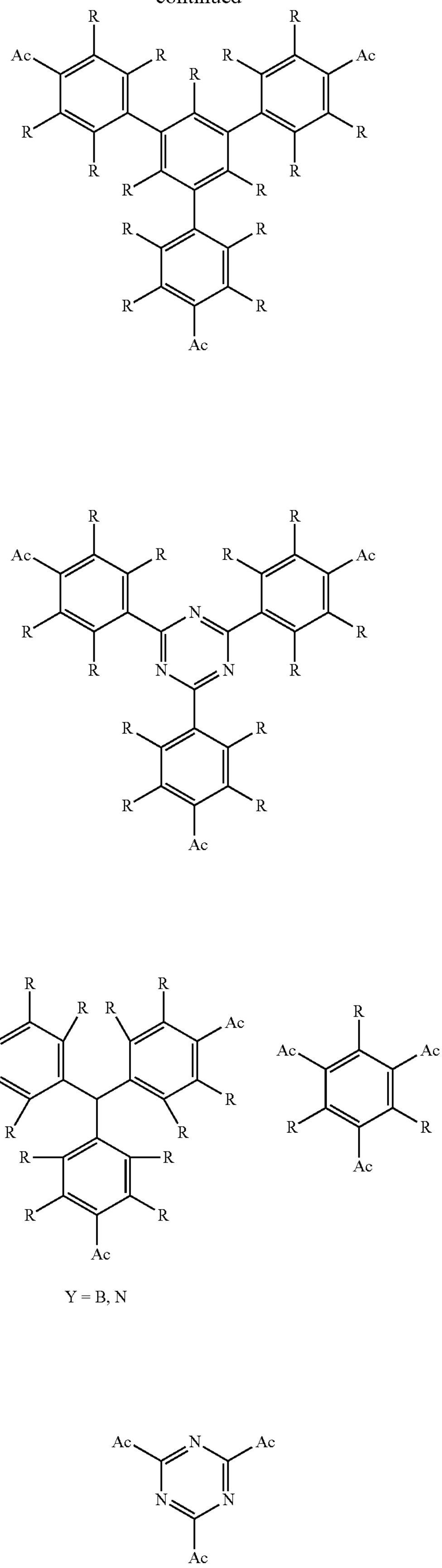

-continued
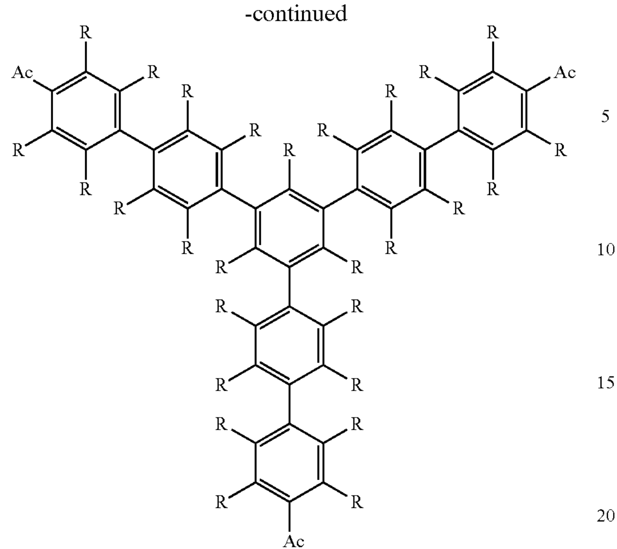
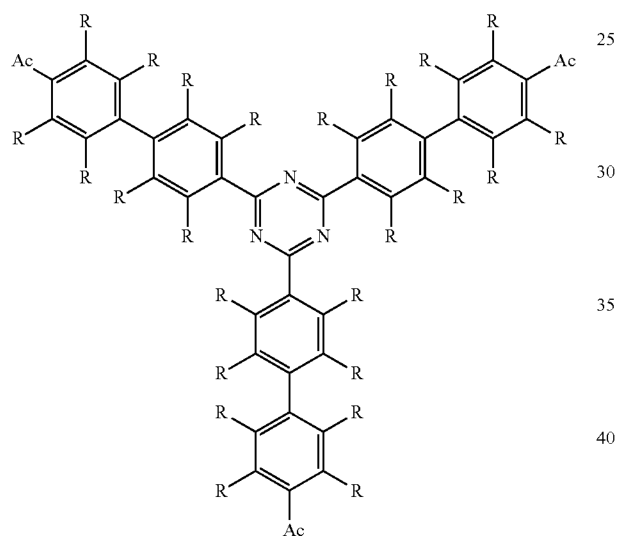
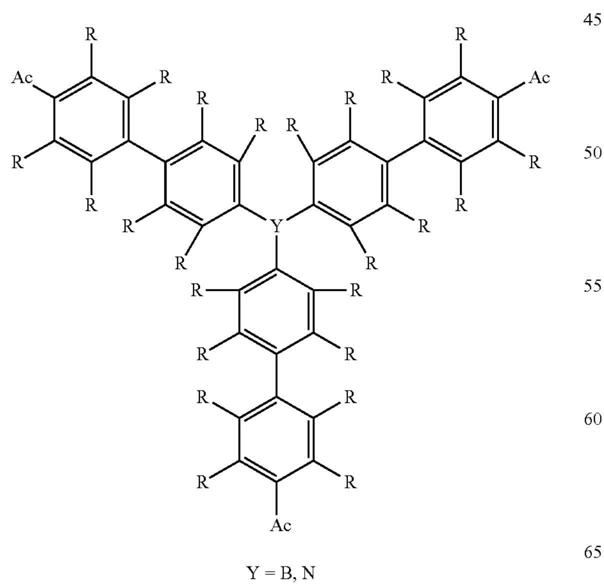
Y = B, N
-continued
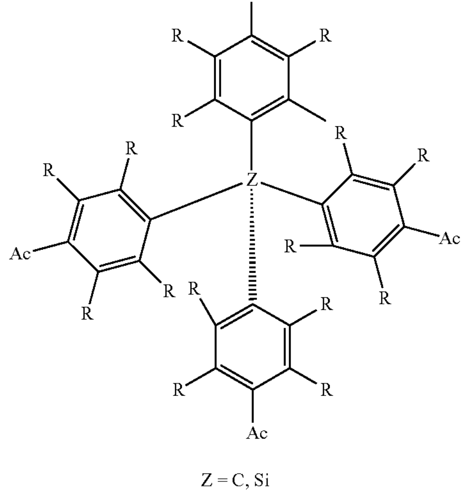
Z = C, Si
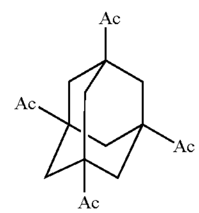
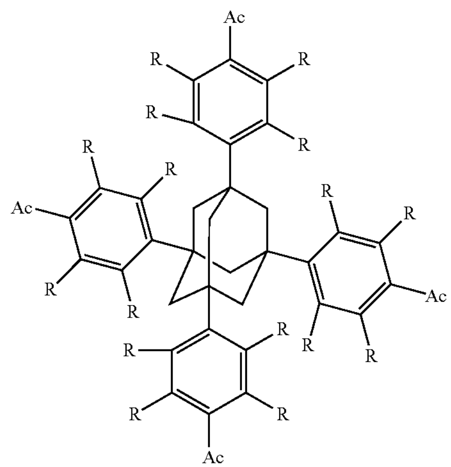

-continued

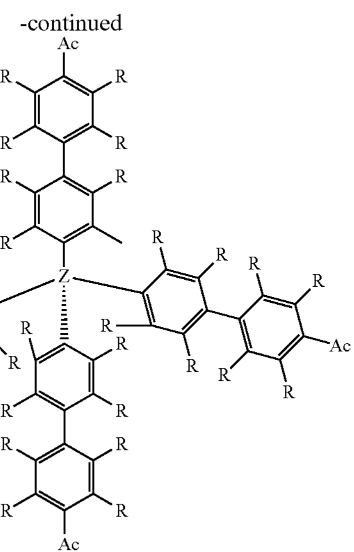

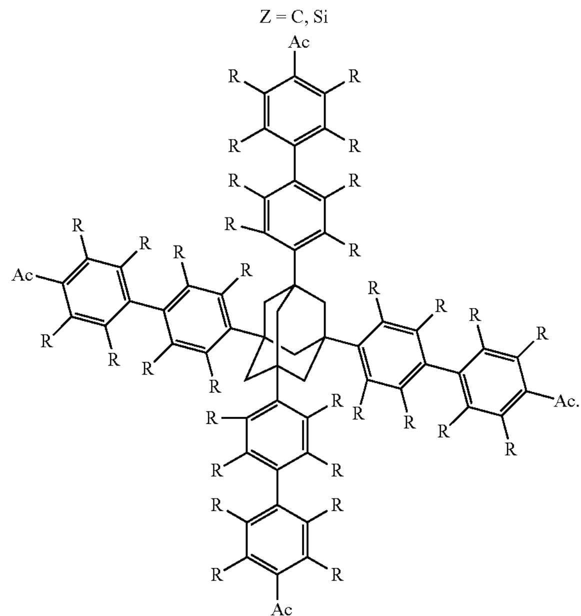

12. The filter material as claimed in claim 1, wherein the support is gas-permeable, wherein the support has a gas permeability of at least 10 $l \cdot m^{-2} \cdot s^{-1}$ and up to 20,000 $l \cdot m^{-2} \cdot s^{-1}$ at a flow resistance of 127 Pa.

13. The filter material as claimed in claim 1, wherein the support has a three-dimensional structure, wherein the support is formed as an open-cell foam and wherein the support has a specific weight in the range from 5 to 1,000 $g/m^2$.

14. The filter material as claimed in claim 1, wherein the polymer particles are preferably in spherical form.

15. The filter material as claimed in claim 1, wherein the polymer particles have a total pore volume in the range from 0.05 $cm^3/g$ to 5.0 $cm^3/g$.

16. The filter material as claimed in claim 15, wherein 20% to 99% of the total pore volume of the polymer particles is formed by micropores with pore diameters of ≤20 Å.

17. The filter material as claimed in claim 1, wherein the micropore volume of the polymer particles formed by micropores with pore diameters of ≤20 Å is in the range from 0.01 to 1.5 $cm^3/g$.

18. The filter material as claimed in claim 1, wherein the average pore diameter of the polymer particles is in the range from 1 to 100 Å, and wherein the BET surface of the polymer particles is in the range from 100 $m^2/g$ to 7,000 $m^2/g$.

19. The filter material as claimed in claim 1, wherein the organic polymers and/or polymer particles are modified after completion of poly(acetylcyclotrimerization) by at least one of postcuring and functionalization.

20. The filter material as claimed in claim 1, wherein the polymer particles have, at a pressure of 1 bar and a temperature of 77 K, a hydrogen storage and/or hydrogen loading capacity from 0.1 to 50 wt %, relative to the polymer particles.

21. The filter material as claimed in claim 1, wherein the polymer particles are used or combined together with another, different particulate porous material, wherein the further material is selected from the group consisting of activated charcoal; zeolites; porous metal oxide particles; porous metal particles; ion exchange resins; inorganic oxides; porous organic-inorganic hybrid polymers; organometallic structured materials; MOFs (metal organic frameworks); mineral granules; clathrates; and mixtures and combinations thereof.

22. The filter material as claimed in claim 1, wherein the filter material is a textile filter material.

* * * * *